(12) United States Patent  
Vidovich

(10) Patent No.: US 7,546,181 B2  
(45) Date of Patent: Jun. 9, 2009

(54) METHOD AND APPARATUS USING SOIL CONDUCTIVITY THRESHOLDS TO CONTROL IRRIGATING PLANTS

(76) Inventor: Nikola V. Vidovich, 1313 Villagio Dr., El Dorado Hills, CA (US) 95762

( * ) Notice: Subject to any disclaimer, the term of this patent is extended or adjusted under 35 U.S.C. 154(b) by 349 days.

(21) Appl. No.: 11/335,941

(22) Filed: Jan. 20, 2006

(65) Prior Publication Data

US 2007/0173981 A1    Jul. 26, 2007

(51) Int. Cl.  
*G05D 7/00* (2006.01)  
*G05B 21/00* (2006.01)

(52) U.S. Cl. ........................ 700/284; 324/696
(58) Field of Classification Search ................ 700/284; 324/696  
See application file for complete search history.

(56) References Cited

U.S. PATENT DOCUMENTS

| | | | |
|---|---|---|---|
| 4,026,467 A | 5/1977 | Ayme de la Chevreliere | |
| 4,194,691 A | 3/1980 | Birnbach et al. | |
| 4,214,701 A | 7/1980 | Beckmann | |
| 4,396,149 A | 8/1983 | Hirsch | |
| 4,646,224 A | 2/1987 | Ransburg et al. | |
| 4,657,039 A | 4/1987 | Bireley et al. | |
| 4,683,904 A | 8/1987 | Iltis | |
| 4,693,419 A | 9/1987 | Weintraub et al. | |
| 4,796,654 A | 1/1989 | Simpson | |
| 5,179,347 A * | 1/1993 | Hawkins | 324/696 |
| 5,208,855 A | 5/1993 | Marian | |
| 5,749,521 A * | 5/1998 | Lattery | 239/64 |
| 6,016,971 A | 1/2000 | Welch et al. | |
| 6,079,433 A * | 6/2000 | Saarem | 137/1 |
| 6,618,673 B2 * | 9/2003 | Zur | 702/2 |

* cited by examiner

*Primary Examiner*—Michael D Masinick  
(74) *Attorney, Agent, or Firm*—GSS Law Group

(57) ABSTRACT

Method and apparatus determining the water absorption gradient and controlling the irrigation system based upon the water absorption gradient. The means for determining uses at least a first electrical coupling and a second electrical coupling, which electrically couple with a first probe and a second probe, placed in the soil near the at least one plant.

37 Claims, 18 Drawing Sheets

METHOD AND APPARATUS USING SOIL CONDUCTIVITY THRESHOLDS TO CONTROL IRRIGATING PLANTS

TECHNICAL FIELD

This invention relates to controlling an irrigation system, in particular, to an electronic system enabling the irrigation system to deliver the needed amount of water to plant roots.

BACKGROUND OF THE INVENTION

A grass watering process by an irrigation system, for example a sprinkler system, usually does not produce an optimum result. Often these systems are controlled by a system timer set to run watering cycles for a fixed period of time on a list of days of the week and/or the month. At present, there is no effective device that can indicate that a sufficient water level has been reached by plant roots, and feedback this information to water electric valves.

Common irrigation systems, controlled only by a time clock, deliver water to plants and/or lawns regardless of whether the watering is needed. Recently, new devices have appeared on the market that consider several parameters in controlling irrigation systems. These parameters include ambient temperature, wind speed, day light, and predicted water absorption. Some of these devices may even connect to weather satellite links to acquire some or all of these parameters. Such devices are complex, costly, and require specialized operational skills and manual adjustments. And they still may not deliver the optimal amount of water due to lack of feedback about soil and water conditions at grass roots system.

Many moisture sensors have been designed to provide feedback from the soil. They have had limited success, because they have tended to measure the absolute soil moisture level. The main problem with such device is that soil conditions can significantly modify the readings. These changes in soil conditions may be caused by, for example, salts from fertilizers, soil compactness changes with time, leakage conductance from faulty wire splicing, and electrochemical deposition on moisture probes themselves. Any of these changes in soil conditions often requires a manual readjustment to the irrigation system controller for optimal performance.

A method and apparatus implementing that method are needed for the control of an irrigation system providing at least some, and preferably all, of the following benefits: delivering of optimum watering of the plants regardless of weather conditions; minimizing and/or eliminating over-watering reduces operating costs; minimizing and/or eliminating manual adjustments, reduces operating costs; minimal expense and minimal complexity to install.

SUMMARY OF THE INVENTION

The invention includes an apparatus that may monitor, regulate, and maintain a needed amount of water delivery to plants, in particular to the roots of plants by controlling an irrigation system. As used herein, the term plant will refer to grasses, clovers, alfalfas, and ground covers. As used herein, an irrigation system may include, but is not limited to, at least one sprinkler, at least one soak hose, at least one drip spigot, and/or at least one drip hose.

In particular, the apparatus may monitor, regulate, and maintain a needed amount of water delivery to grass roots and assure a beautiful lawn through operating the irrigation system with an ecologically friendly irrigation method.

The invention's apparatus may respond to at least some plant relevant conditions, in certain preferred embodiments, to grass relevant ambient conditions and may direct administering the appropriate amount of water by the irrigation system. The invention may detect the loss of water level in the root system of the plants. The water loss may be caused by transpiration, evaporation, and/or percolation into soil below the plant roots. The invention may monitor the water absorption rate during the watering process. The invention's absorption rate measurements tend to be unaffected by the type of soil, its condition, or the spacing of the probes placed in the soil.

The invention's method of controlling an irrigation system provides the following benefits.

The controlled irrigation system provides optimum plant watering regardless of weather conditions.

There is a cost reduction and water saving due to minimizing over-watering by the irrigation system.

There is less labor required by eliminating periodic manual adjustments to the controller of the irrigation system.

Rainwater absorption into the roots of the plants may be automatically detected.

Rain probes exist in the market, detect rain but do not prevent watering after the rain even when the soil is saturated.

Gushing water flowing out of a broken sprinkler head may be detected, and the irrigation system may be directed to shut down the corresponding water electric valve, minimizing the waste of water.

A dry soil condition caused by a faulty sprinkler line may be detected and reported by the apparatus controlling the irrigation system.

Manual intervention after an initial installation may not be required, minimizing the labor required to maintain the apparatus.

The control apparatus is inexpensive.

The control apparatus is easy to install, requiring no specialized tools.

The invention may control an irrigation system, by monitoring soil conductivity to create a present value and a past value, and determining a water absorption gradient based the present value and the past value. The water absorption gradient is most easily seen as the ratio of the difference between the present and past values divided by the present value, which will be referred to herein as the soil conductivity scale ratio. The inventor has discovered that while soil conductivity tends to be unreliable as a measure of water absorption, the water absorption gradient is reliable. The invention utilizes this insight as the basis for control decisions.

The invention includes an apparatus, which may monitor, regulate, and maintain a needed amount of water delivery to plants, in particular to the roots of plants by controlling an irrigation system. As used herein, the term plant will refer to grasses, clovers, alfalfas, and ground covers. The irrigation system may water more than one plant, and the plants may be included in a lawn. One skilled in the art may recognize that differing plants may have differing watering requirements, and that some embodiments of the invention may be able to operate differently for different plants.

The apparatus may include a means for determining the water absorption gradient and a means for controlling the irrigation system based upon the water absorption gradient. The means for determining uses at least a first electrical coupling and a second electrical coupling, which electrically couple with a first probe and a second probe, placed in the soil near the at least one plant.

At least one of the probes has a face with a surface area of at least N square inches. Preferably, each of the probes has at least one face with the surface area of at least N square inches. The N may be at least one and one-half, and may further preferably be at least two. Preferably, at least one of the following is true for each of the probes: the face is nearly flat; the face is rounded; the face is at least partly concave; the face is at least partly convex; the face has a polygonal boundary; and the face has a curved boundary.

As used herein, an irrigation system may include, but is not limited to, at least one sprinkler, at least one soak hose, at least one drip spigot, and/or at least one drip hose. Controlling the irrigation system may include controlling an electric valve. The electric valve is used as an example control device within the irrigation system. Controlling the electric valve may include at least one of turning-off the electric valve when the water absorption gradient is below a first threshold, and turning-on the electric valve when the water absorption gradient is below a second threshold.

There are several ways in which these control decisions may be implemented, including, but not limited to, using a computer and/or a finite state machine. Both approaches are disclosed and developed to some level of detail.

The means for determining the water absorption gradient may include a means for injecting a test signal between the first probe and the second probe and a means for measuring the gradient based upon the conductivity between the probes to provide a soil conductivity sample value. The means for injecting may include a first Digital to Analog Converter at least partly driving an amplifier. The first digital to analog converter may further drive a first filter, which in turn drives the amplifier. A second digital to analog converter may drive the amplifier to control the gain of the amplifier.

Alternatively, the means for injecting may include an oscillator at least partly driving the amplifier. The oscillator may further drive a second filter, which in turn drives the amplifier. The oscillator may or may not be directly controlled by the means for controlling. The oscillator may include a voltage controlled oscillator. Alternatively, the oscillator may include a first finite state machine driving a third digital to analog converter. The oscillator may further include a programmable logic device driving a resistor network interface. A second digital to analog converter may drive the amplifier to control the gain of the amplifier.

The means for measuring may include an analog to digital converter creating a soil conductivity sample value at least partly based upon the conductivity between the first electrical coupling and the second electrical coupling. The analog to digital converter may be at least partly driven by a third filter, which is in turn fed by the first electrical coupling and the second electrical coupling. The third filter may further drive a detector, which at least partly drives the analog to digital converter.

The detector may further drive an attenuator, which in turn drives the analog to digital converter. The detector may be a peak detector, alternatively, a root-mean-square detector, or another form of an integrator, possibly windowed.

The attenuator may include at least two attenuation settings, which may further be controlled by a computer, finite state machine, and/or the means for controlling the irrigation system. The attenuator settings may act to scale the conductivity reading of the analog to digital converter, creating the soil conductivity sample value as a scaling of the conductivity, which may then be used in the determination of the water absorption gradient.

The means for controlling may include the water absorption gradient, which is used for control decisions about the irrigation system. The water absorption gradient may be implemented using the present value of the soil conductivity sample value and the past value. Alternatively, the water absorption gradient may be implemented using the present value and the difference of the present value and the past value. Also, the water absorption gradient may be implemented using the soil conductivity scale ratio.

The means for controlling may include a finite state machine and/or a computer accessibly coupled to a memory, and directed by a program system including program steps residing in the memory. In certain embodiments, the finite state machine and/or the computer may be considered separate from the means for determining and the means for controlling. The finite state machine and/or the program system may implement the method controlling the irrigation system.

The memory may include the water absorption gradient. The memory may include a non-volatile memory component. The program steps of the program system reside in the non-volatile memory component. At least the past value may reside in the non-volatile memory component at least part of the time.

Alternatively, the water absorption gradient may include a non-volatile memory component, referred to herein as the past value store, which may be used at least some of the time to retain the past value.

The means for controlling the irrigation system may include a valve interface receiving an valve interface control to drive the control electrical coupling to the electric valve included in the irrigation system. The valve interface may further receive a common power coupling and/or a specific power coupling. The valve interface may include a relay controlled by the valve interface control, which may preferably switch between the common power coupling and the specific power coupling driving the control electrical coupling.

The means for controlling may further include the means for turning-on the irrigation system and/or the means for turning-off the irrigation system. The means for turning-on may provide a valve interface on-control to the valve interface. The means for turning-on may include a relay latch providing the valve interface on-control. The past value state and the present value state may be provided to a comparator, which generates a comparator result provided to the relay latch. The comparator result could indicate an arithmetic comparison of the present value and the past value, or the logical negation of the arithmetic comparison. The comparator result could indicate that the present value is greater than the past value, that the present value is greater than or equal to the past value, or that the present value is less than the past value.

Similarly, the means for turning-off may provide a valve interface off-control to the valve interface. The means for turning-off may include a second relay latch providing the valve interface off-control. The past value state and the present value state may be provided to a second comparator, which generates a second comparator result provided to the relay latch. The second comparator result could indicate an arithmetic comparison of the present value and the past value, or the logical negation of the arithmetic comparison. The second comparator result could indicate that the present value is greater than the past value, that the present value is greater than or equal to the past value, or that the present value is less than the past value.

The valve interface may include a third relay latch providing the irrigation control signal. The valve interface may further receive the valve interface off-control and/or the valve interface on-control. The valve interface may further include a logic network receiving the valve interface off-control and the valve interface on-control to create an irrigation control direction presented to the third relay latch.

As used herein, any of the latches may support synchronous and/or asynchronous operation, including but not limited to, Reset Set (RS) flop-flops, D flip-flops, and master-slave (JK) flip-flops, for example.

The apparatus may include more than one specific power coupling, and drive more than one electric valve. The apparatus may be included in the timer. The timer may include more than one instance of the apparatus.

The apparatus may incorporate a self-calibration process and/or mechanism. Preferably, the time steps between sampling soil conductivity may be essentially equal. Alternatively, the time steps may vary.

BRIEF DESCRIPTION OF THE DRAWINGS

FIGS. 12B to 13E shows details of various implementations of the means for controlling of the previous Figures;

DETAILED DESCRIPTION

Figure 1A:
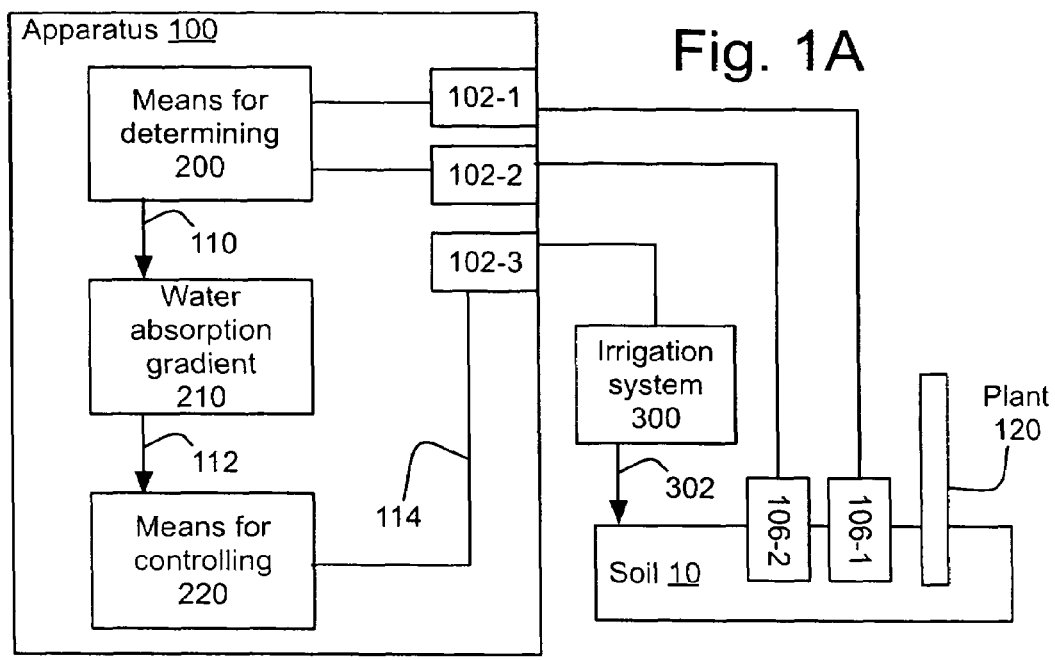
FIG. 1A shows an apparatus in accord with the invention.
Figure 1B:
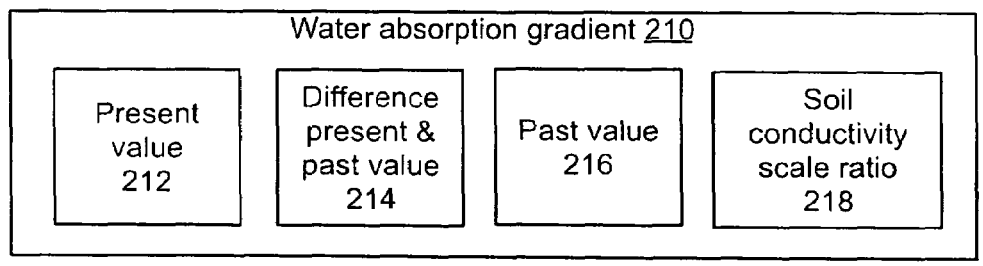
FIGS. 1B and 1C shows some details of FIG. 1A.

This invention relates to controlling an irrigation system, in particular, to an electronic system enabling the irrigation system to deliver the needed amount of water to plant roots.

The invention includes an apparatus that may monitor, regulate, and maintain a needed amount of water delivery to plants, in particular to the roots of plants by controlling an irrigation system. As used herein, the term plant will refer to grasses, clovers, alfalfas, and ground covers. As used herein, an irrigation system may include, but is not limited to, at least one sprinkler, at least one soak hose, at least one drip spigot, and/or at least one drip hose.

The invention preferably controls an irrigation system 300, by monitoring soil conductivity to create a present value 212 and a past value 216, and determining a water absorption gradient 210 based upon the present value and the past value as shown in FIGS. 1A, 3A, 6A, 10A, 12A and 14. The water absorption gradient is most easily seen as the ratio of the difference between the present and past values divided by the present value, which will be referred to herein as the soil conductivity scale ratio 218. The inventor has discovered that while soil conductivity tends to be unreliable as a measure of water absorption, the water absorption gradient is reliable, being relatively unaffected by changing soil conditions other than water absorption. The invention utilizes this insight as the basis for control decisions.

In certain embodiments, the apparatus 100 may monitor, regulate, and maintain a needed amount of water delivery to grass roots and assure a beautiful lawn 130 through operating the irrigation system 300 with an ecologically friendly irrigation method.

The invention's apparatus 100 may respond to at least some plant 120 relevant, in certain preferred embodiments, to grass 122 relevant ambient conditions and may direct administering the appropriate amount of water by the irrigation system 300. The invention may detect the loss of water level in the root system of the plants. The water loss may be caused by transpiration, evaporation, and/or percolation into soil below the plant roots. The invention may monitor the water absorption rate during the watering process. The invention's water absorption gradient 210 determinations tend to be unaffected by the type of soil 10, its condition, or the spacing of the first probe 106-1 from the second probe 106-2 placed in the soil 10.

The invention's method of controlling an irrigation system 300 provides the following benefits.

The controlled irrigation system provides optimum plant 120 watering regardless of weather conditions.

There is a cost reduction and water saving due to minimizing over-watering by the irrigation system.

There is less labor required by eliminating periodic manual adjustments to the controller of the irrigation system.

Rainwater absorption into the roots of the plants may be automatically detected.

Rain probes exist in the market, detect rain but do not prevent watering after the rain even when the soil is saturated.

Gushing water flowing out of a broken sprinkler head may be detected, and the irrigation system may be directed to shut down the corresponding water electric valve, minimizing the waste of water.

A dry soil condition caused by a faulty sprinkler line may be detected and reported by the apparatus controlling the irrigation system.

Manual intervention after an initial installation may not be required, minimizing the labor required to maintain the apparatus.

The control apparatus is inexpensive.

The control apparatus is easy to install, requiring no specialized tools.

Figure 1C:
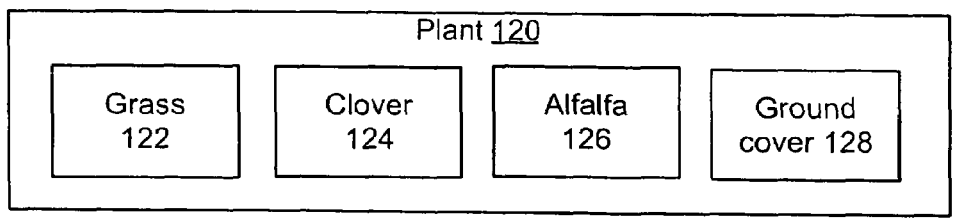
Figure 1D:
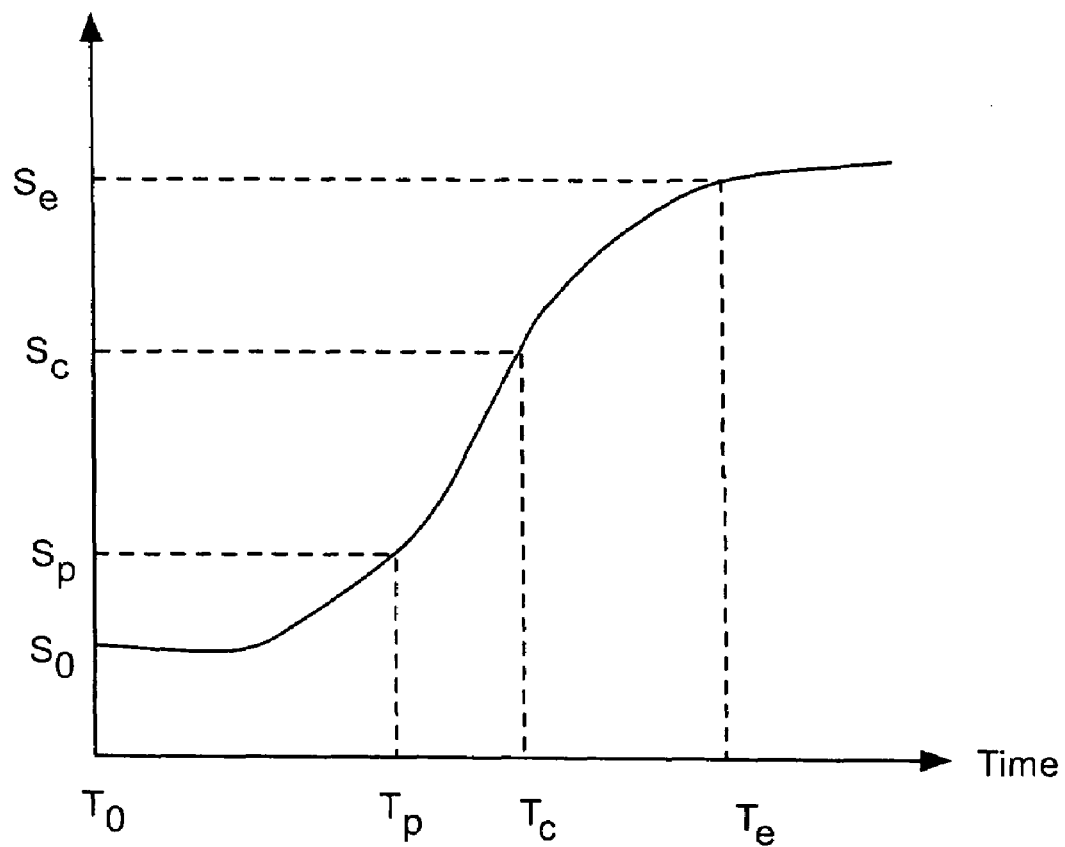
FIG. 1D shows an example of the effects of watering on soil conductivity.

The electrical conductance of the soil 10 between the first probe 106-1 and the second probe 106-2 tends to increase as the water level increases in the root system of the plants, as shown in FIG. 1D. The water absorption gradient 210 may be represented as the difference between present and past value 214, scaled by the present value 212, which is referred to herein as the soil conductivity scale ratio 218. As the soil becomes saturated with water, while the electrical conductance continues to increase, the soil conductivity scale ratio becomes smaller. It continues to becomes smaller until the nearly zero, indicating that the soil is water saturated, often called the water refill capacity or the water refill point.

The detection and use of the various representations of the water absorption gradient 210 rather than absolute values of soil conductance represents a central element of the invention. One advantage of using the water absorption gradient over the soil conductance is that the water absorption gradient tends to be insensitive to time, fertilizers applied to the soil, their concentration, and weather conditions, all of which can dramatically affect soil conductivity readings.

Figure 10A:
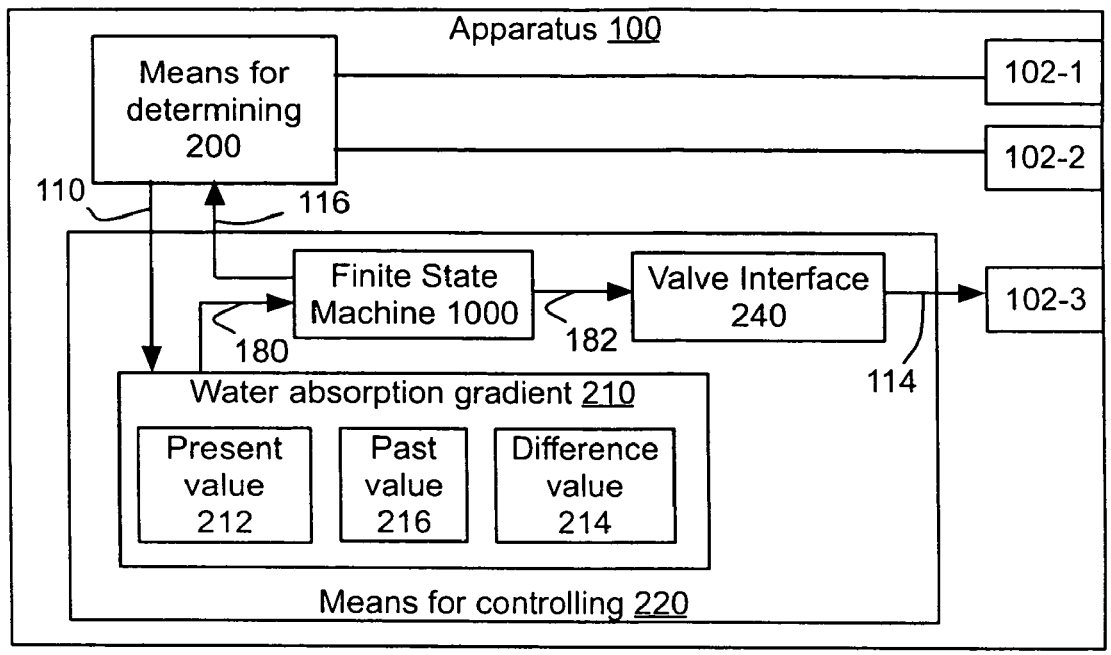
FIG. 10A shows another example implementation of the apparatus of FIG. 1A, using a finite state machine.
Figure 10B:
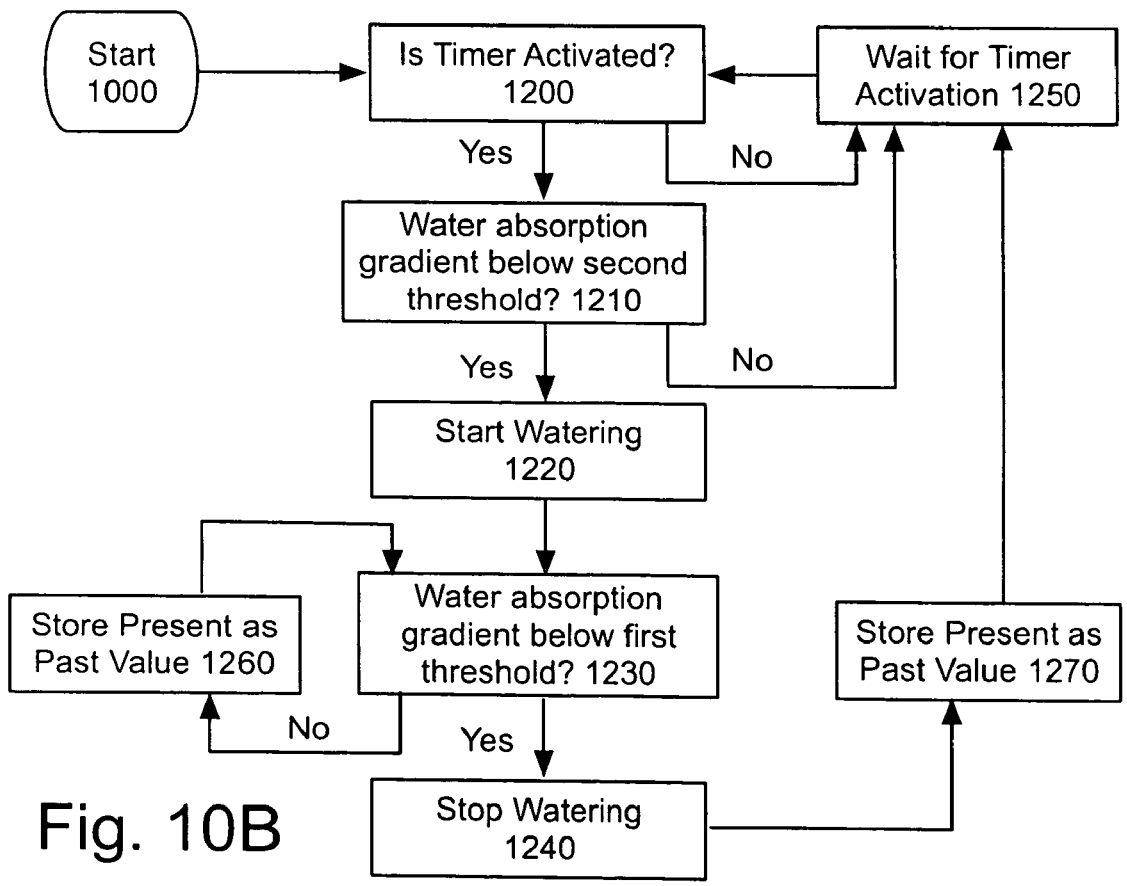
FIG. 10B shows a flowchart operating the means for controlling of FIGS. 1A, 3A, 6A, and 10A, which may also be used to at least partly implement the program system of FIGS. 3A and/or 6A, alternatively, to implement the finite state machine of FIG. 10A.
Figure 11A:
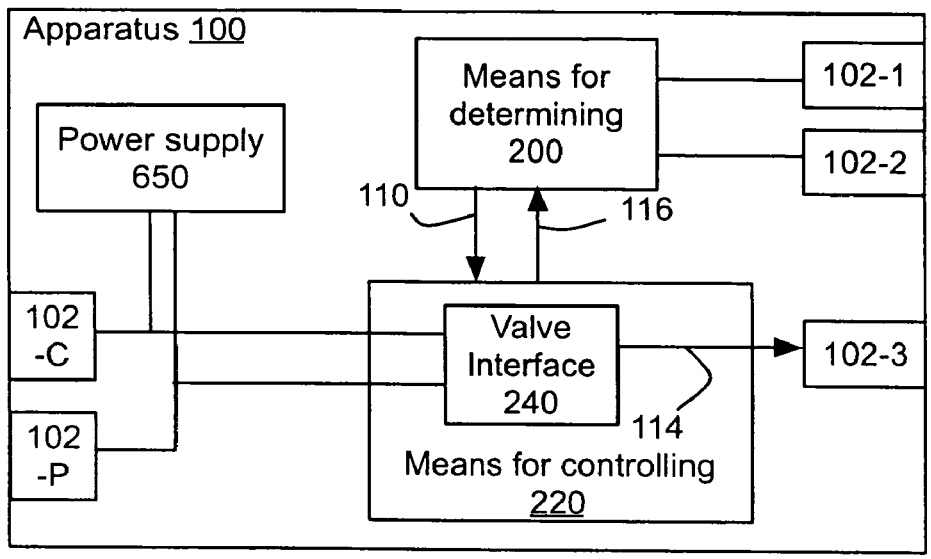
FIG. 11A shows an example of the apparatus of the previous Figures including a power supply, a electric valve interface, a common coupling, and a power coupling.
Figure 11B:
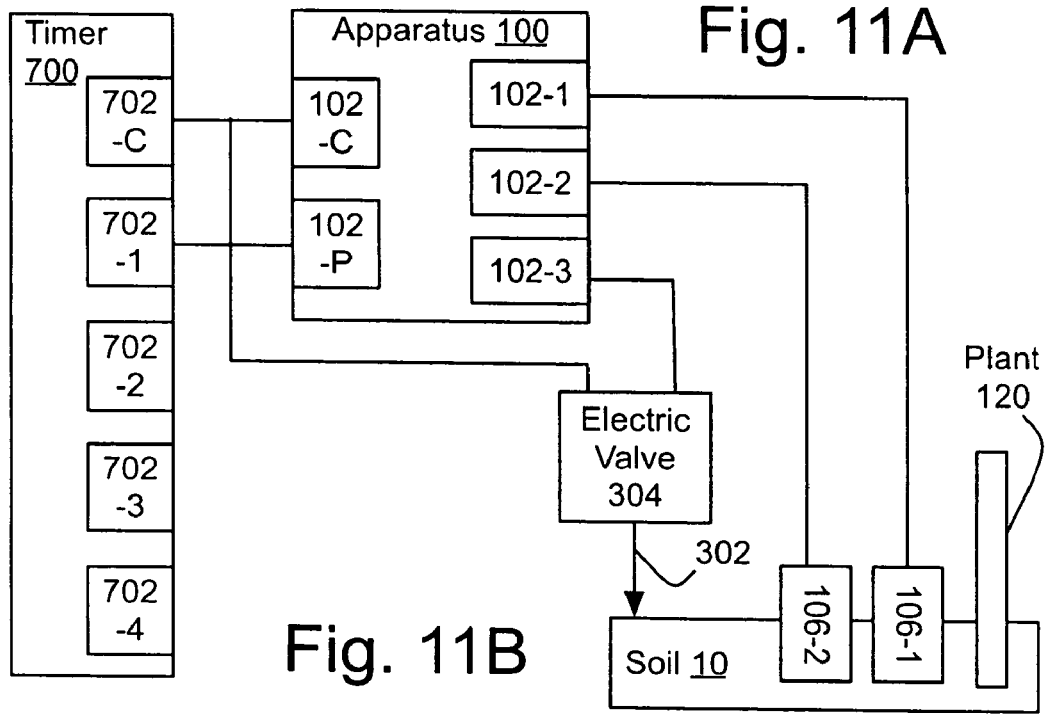
FIG. 11B shows the apparatus of FIG. 11A coupled to a irrigation timer and controlling an electric valve in the irrigation system.
Figure 12A:
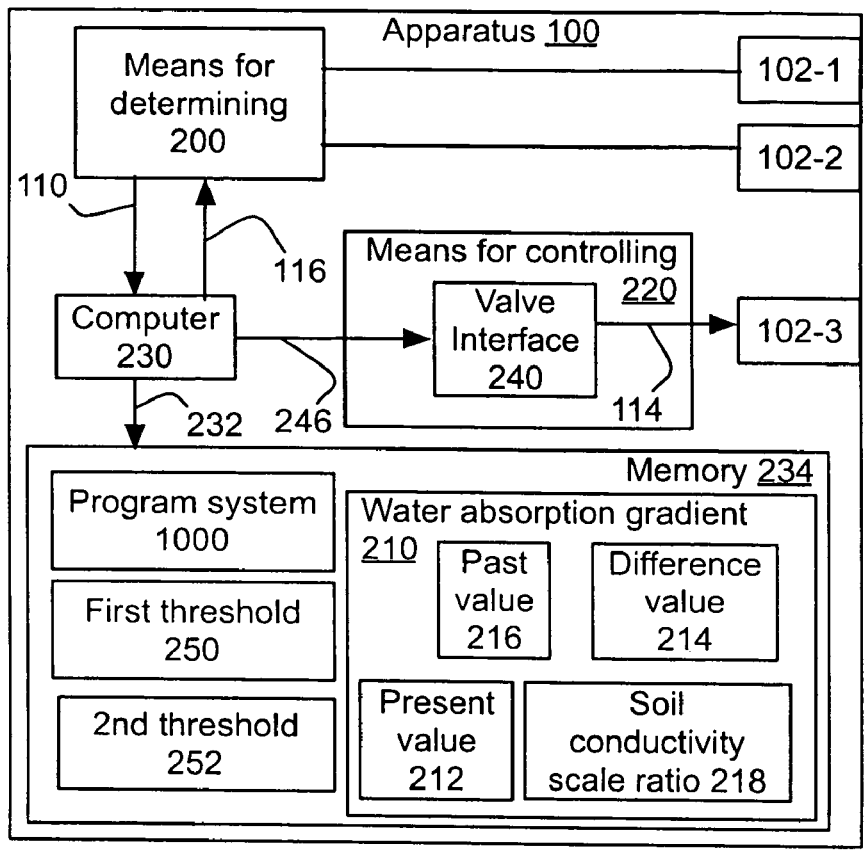
FIG. 12A shows another example of an implementation of the apparatus of the previous Figures.
Figure 12B:
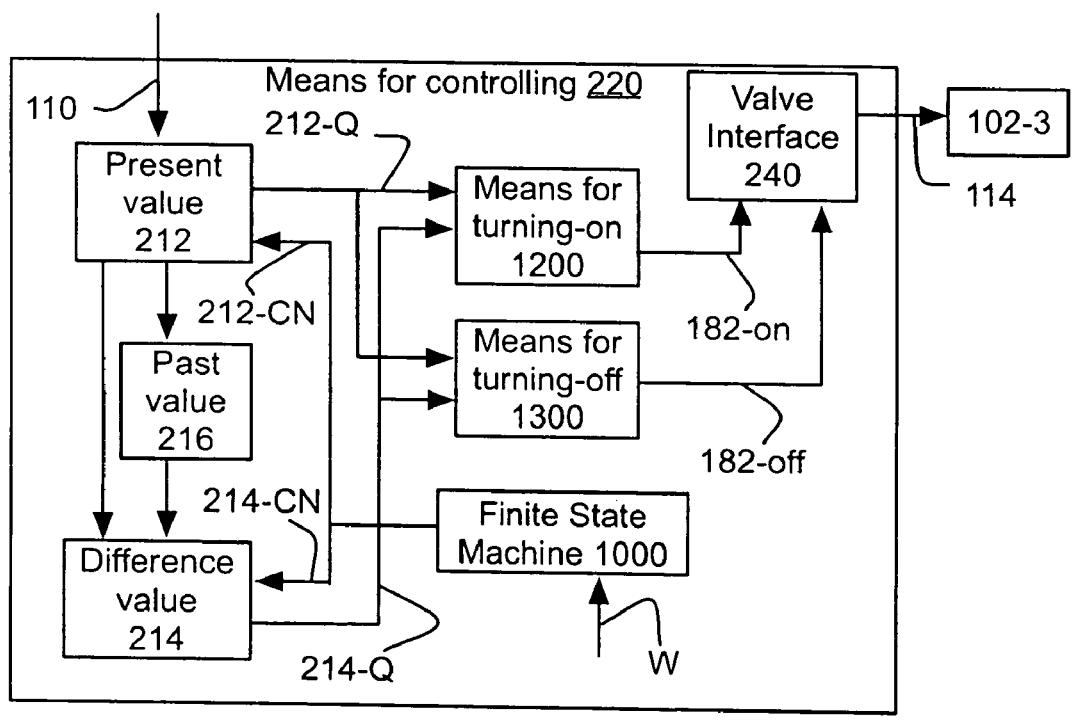

Looking at FIG. 1D in greater detail, the rate of change of soil conductivity and of water absorption changes during the watering cycle. Typically, the rate of water delivery is nearly constant for most, if not all, of the watering cycle. The vertical axis is labeled and represents soil conductivity between the first probe 106-1 and the second probe 106-2. The horizontal axis is labeled and represents time from the start of a watering cycle. The following designations are useful:

T0 represents the time of the start of the watering cycle, typically initiated by the timer 700, often through
- the assertion of power on the specific power coupling 102-P as in FIGS. 11B, and/or 16A to 17, and/or
- the W stimulus of the finite state machine 1000 in FIG. 12B, and/or
- the triggering of an interrupt, reset, and/or power-on-reset on the computer 230 in 3A, 6A, and/or 12A, and/or
- the leaving of operation 1250 in FIG. 10B.

S0 represents the soil conductivity measured at T0.

Tc represents the time when the present value 212 is established based upon the soil conductivity sample value 110 as shown in FIGS. 1A, 3A, 6A, 10A, 12A, 12B, 13A, and 14. Sc represents the soil conductivity measured at Tc.

Tp represents the time when the past value 216 was stored, either in the memory 234, the past value latch 216-L, and/or the past value store 216-S. Sp represents the soil conductivity at Tp.

Te represents the time at which the soil 10 reached its water absorption capacity. Se represents the soil conductivity at Te.

Continuing with FIG. 1D.

The water absorption is often negligible at T0, as it takes several minutes for the water to percolate down to the roots and also to affect the conductivity of the soil 10 between the first probe 106-1 and the second probe 106-2.

While there is change in the soil conductivity, a more useful measure is the soil conductivity scale ratio 218, denoted as Scsr, and defined by $$Scsr = (Sc-Sp)/Sc \quad (1.1)$$

The inventor has found through experimentation that the soil conductivity scale ratio 218 offers an effective and reliable measure of the water absorption gradient 210. One skilled in the art will recognize that the definition of Scsr may also use the following formula $$Scsr = (Sc-Sp)/S0 \quad (1.2)$$

While this formula is used and considered part of the invention, it will not be discussed further in order to simplify the overall discussion.

During the watering cycle, the watering should stop when the soil conductivity scale ratio is below a first threshold 250, $a_1$ which may be implemented with either of the following tests $$Scsr \leq a_1 \quad (1.3)$$

$$Scsr < a_1 \quad (1.4)$$

In certain embodiments of the invention the first threshold was set at 1/10. in other embodiments, possible implemented with logic circuits rather than using an attenuator 580, the first threshold may preferably be 1/8. Some alternative tests which provide an essentially equivalent test include any of the following:

$$(Sc-Sp) \leq a_1 Sc \quad (1.5)$$

$$(1-a_1)Sc \leq Sp \quad (1.6)$$

$$(Sc-Sp) < a_1 < Sc \quad (1.7)$$

$$(1-a_1)Sc < Sp \quad (1.8)$$

At the start of the watering cycle, T0, the Sc=S0 and Sp=Se. Watering is needed only when Scsr is below the second threshold 252, $a_2$, which may preferably be set to −½. A similar set of formulas apply in this situation.

Figure 2A:
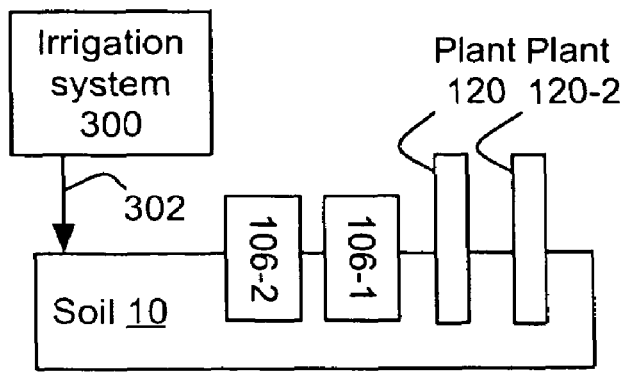
FIGS. 2A to 2E show some details of FIGS. 1A to 1C.
Figure 2B:
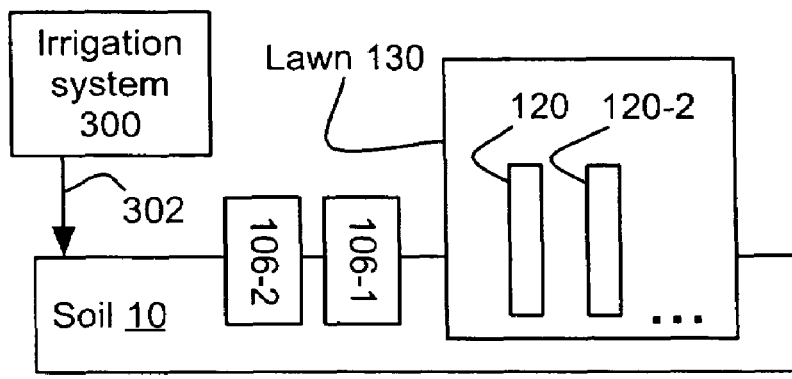
Figure 2C:
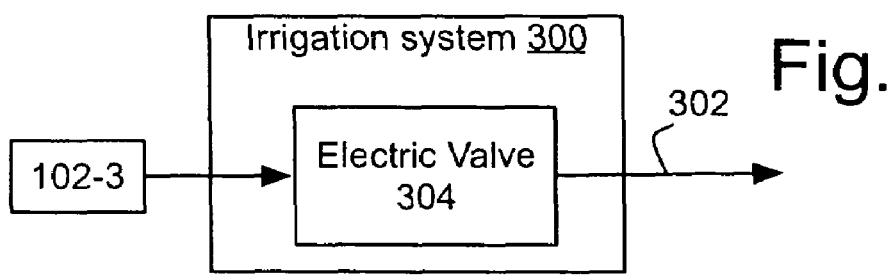

The invention includes an apparatus 100, which may monitor, regulate, and maintain a needed amount of water delivery to at least one plant 120, in particular to the roots of plants by controlling the irrigation system 300. As used herein, the term plant will refer to a grass 122, a clover 124, an alfalfa 126, and a ground cover 128, as shown in FIG. 1C. The irrigation system may water more than one plant, for example a second plant 120-2, and the plants may be included in a lawn 130, as shown in FIGS. 2A and 2B. One skilled in the art may recognize that differing plants may have differing watering requirements. Some embodiments of the invention may be able to operate differently for different plants.

The apparatus 100 may include a means for determining 200 the water absorption gradient 210 and a means for controlling 220 the irrigation system 300 based upon the water absorption gradient. The means for determining uses at least a first electrical coupling 102-1 and a second electrical coupling 102-2, which electrically couple with a first probe 106-1 and a second probe 106-2, placed in the soil 10 near the at least one plant 120.

The apparatus 100, the means for determining 200, and/or the means for controlling 220 may in various embodiments include at least one of a finite state machine, a computer and/or an inferential engine.

Each probe 106 may be primarily composed of a stainless steel. The probe may incorporate an arbitrary shape. The probe may further preferably include a face 108-1 with a surface area of N square inches. N may preferably be at least one and one-half. N may further preferably be at least two. In experiments, the probes were preferably placed at the lawn roots level, were stainless steel rectangles of two inches by one inch. The probes are preferably placed within six inches of each other, and may be as close as three inches or as far away as nine inches.

Figure 2D:
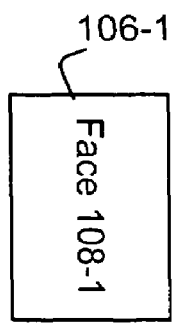
Figure 2E:
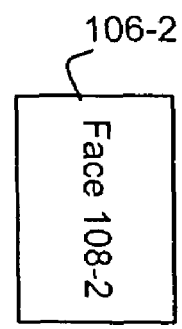

At least one of the first probe 106-1 and the second probe 106-2 has a face with a surface area of at least N square inches, as shown in FIGS. 2D and 2E. Preferably, each of the probes has at least one face with the surface area of at least N square inches. The N may be at least one and one-half, and may further preferably be at least two. Preferably, at least one of the following is true for each of the probes: the face is nearly flat; the face is rounded; the face is at least partly concave; the face is at least partly convex; the face has a polygonal boundary; and the face has a curved boundary. Note that the face 108-1 of the first probe may have a different shape and/or boundary from the second face 108-2 of the second probe.

The apparatus 100 preferably controls at least one electric valve 304 directing water in the irrigation system 300. The irrigation system may include a lawn sprinkler system. The irrigation system may be new or pre-existing. The electric valve may preferably include an electrical solenoid. The apparatus may preferably be electrically connected to the electric valve. The apparatus may further preferably be electrically powered through the electrical connection to the electric valve. The apparatus preferably uses at most a fraction of the power consumed by the electrical solenoid. Preferably, that fraction is less than one-eighth, further preferably less than ten percent. The apparatus includes a control electrical coupling 102-3 used to direct the electric valve, as shown in the Figures.

As used herein, an irrigation system 300 may include, but is not limited to, at least one sprinkler, at least one soak hose, at least one drip spigot, and/or at least one drip hose. Controlling the irrigation system may include controlling an electric valve 304. The electric valve is used as an example control device within the irrigation system. Controlling the electric valve may include at least one of turning-off the electric valve when the water absorption gradient 210 is below a first threshold 250, and turning-on the electric valve when the water absorption gradient 210 is below a second threshold 252.

There are several ways in which these control decisions may be implemented, including, but not limited to, using a computer 230 and/or a finite state machine 1000. Both approaches are disclosed and developed to some level of detail.

Preferably, the first probe 106-1 and the second probe 106-2 are energized by an alternating current, which minimizes or eliminates electrical polarization of the soil 10 when the signal voltage is symmetrically balanced. Further preferred, the alternating current is a low voltage signal with a currier frequency much higher than the local line frequency, which in the United States, is sixty Herz (Hz). By using such a carrier frequency, any induced signal on the wires coupling the probes to the apparatus may be filtered out. By way of example, the carrier frequency may be at least one hundred Hz, one thousand Hz, ten thousand Hz, one hundred thousand Hz, and/or one million Hz.

Figure 6A:
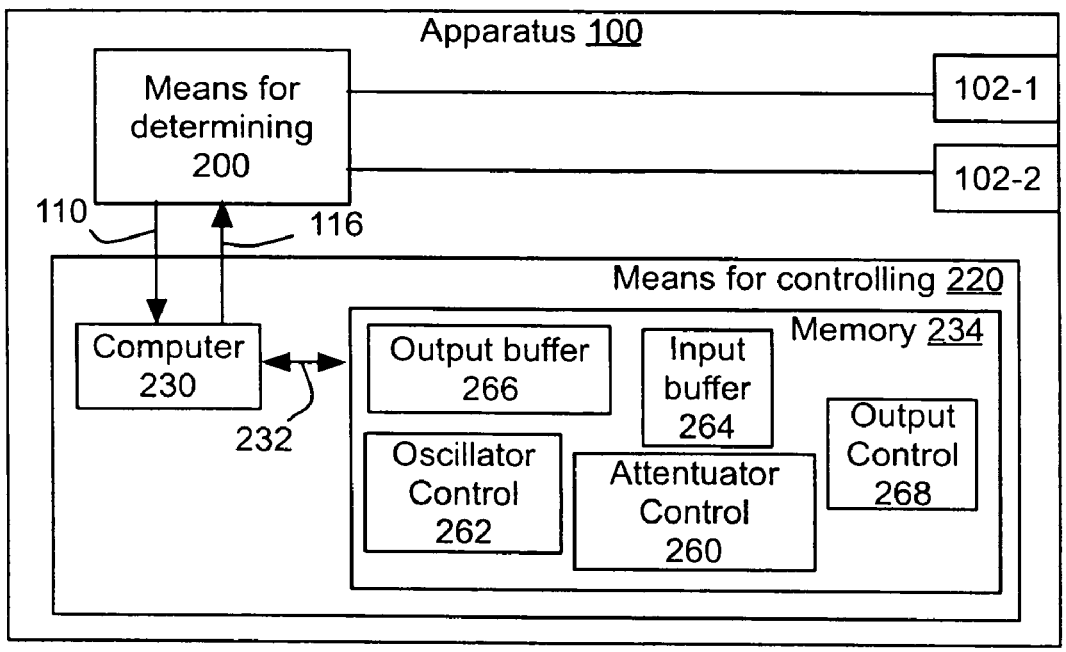
Figure 6B:
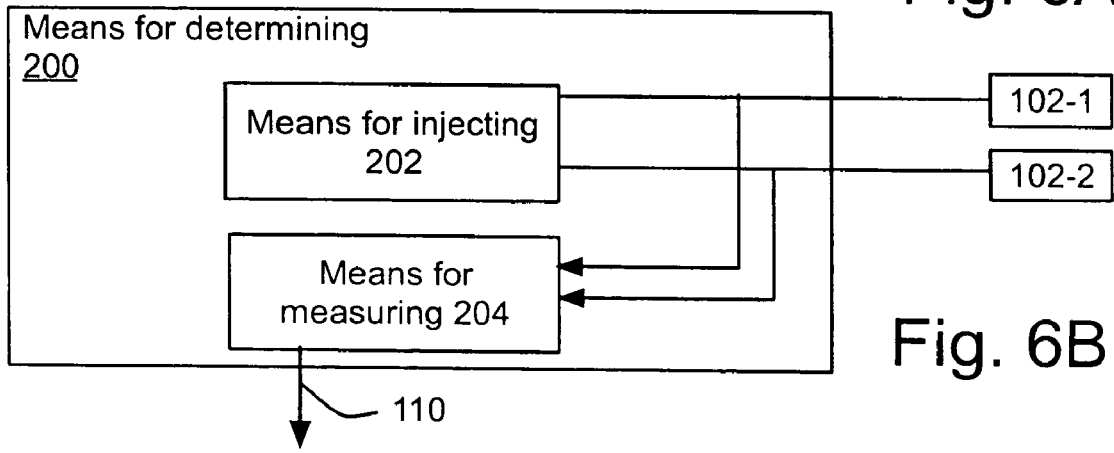
FIGS. 6B to 9E show some details of the means for determining.
Figure 6C:
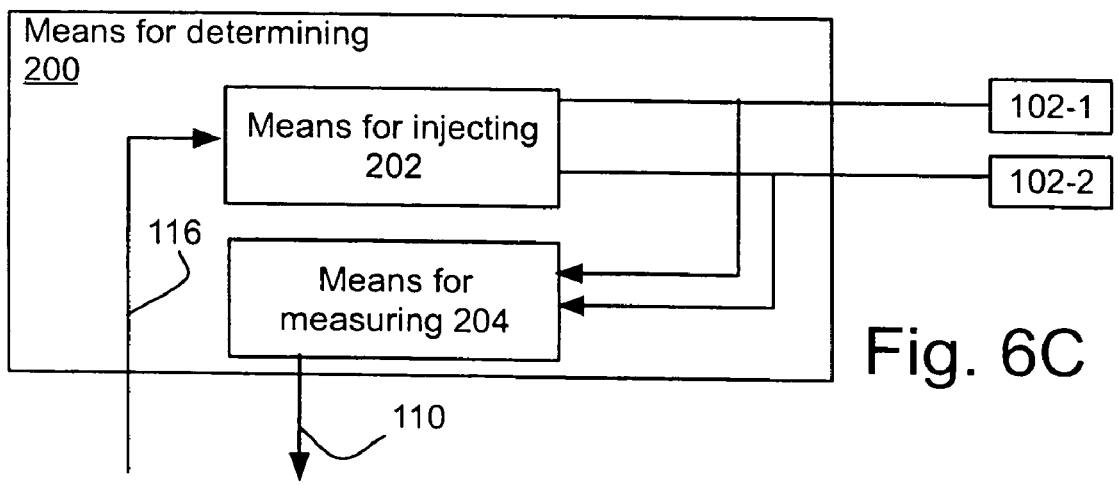
Figure 14:
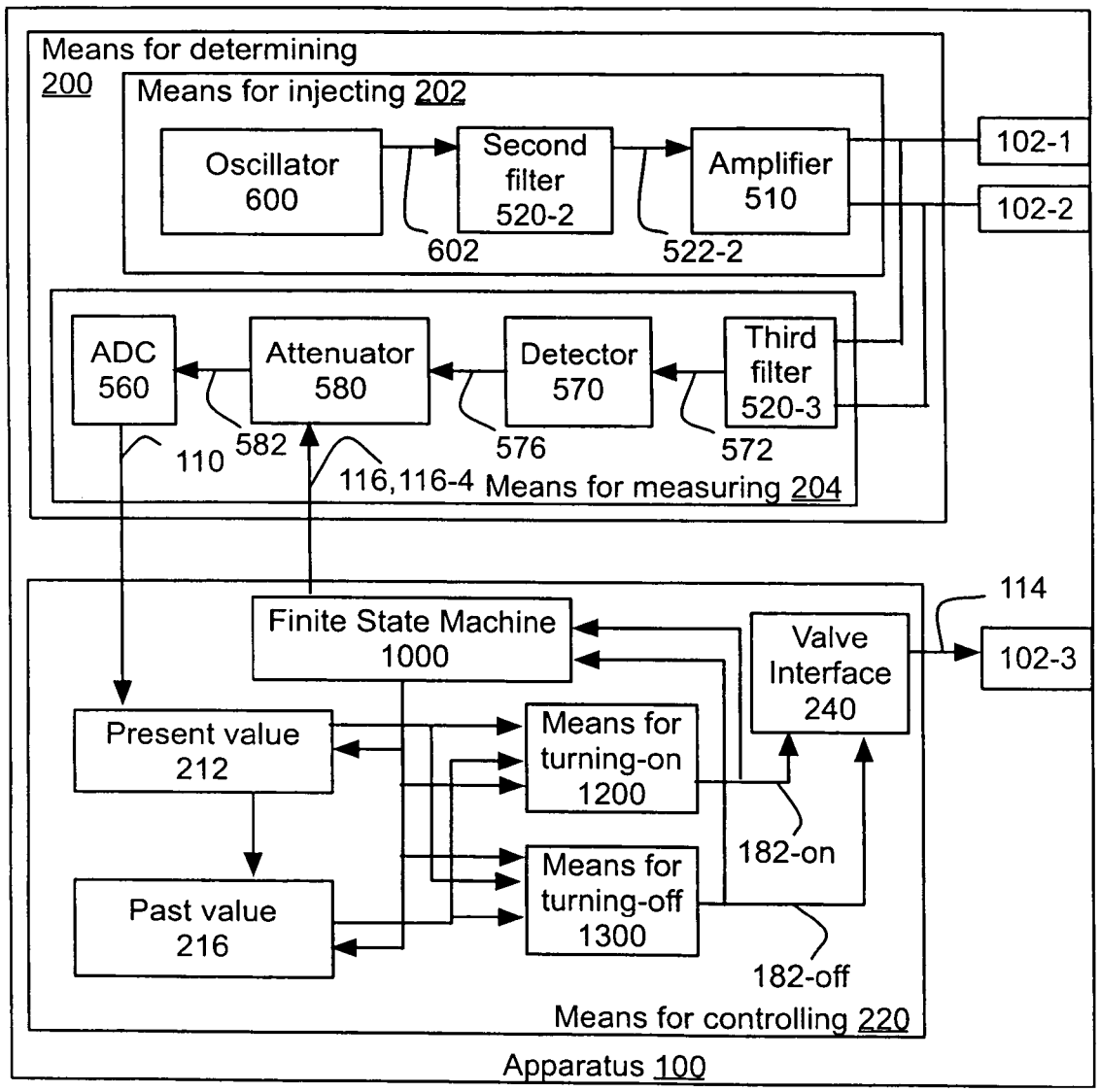
FIG. 14 shows a simplified schematic of a preferred embodiment of the apparatus of the previous Figures.

The means for determining 200 the water absorption gradient 210 may include a means for injecting 202 a test signal between the first electrical coupling 102-1 and the second electrical coupling 102-2 and a means for measuring 204 based upon the conductivity between the probes to provide a soil conductivity sample value 110, as shown in FIGS. 6B, 6C, and 14. In many applications the test signal is delivered through the first electrical coupling 102-1 to the first probe 106-1 and is deliver through the second electrical coupling 102-2 to the second probe 106-2.

Figure 7A:
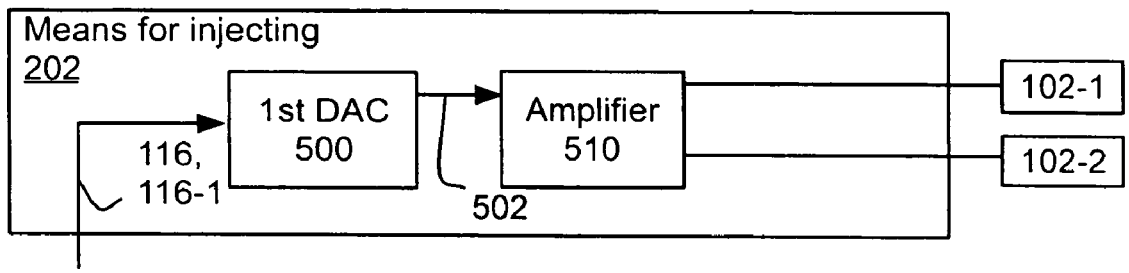
Figure 7B:
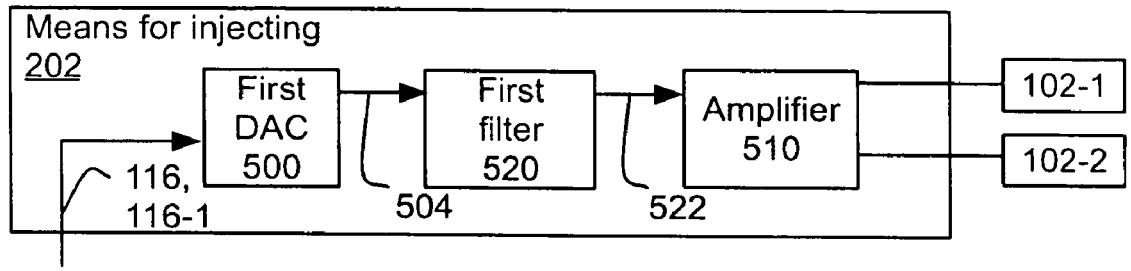
Figure 7C:
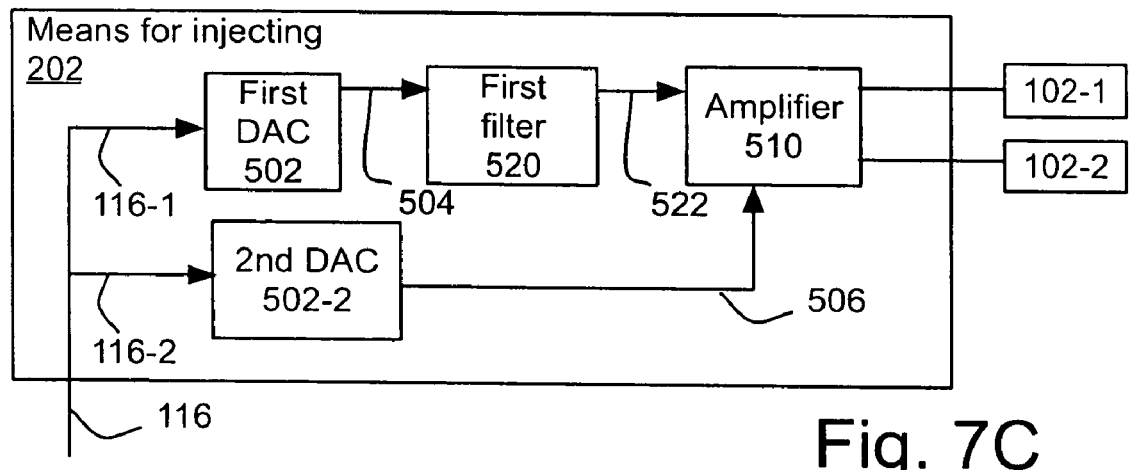

The means for injecting may include a first Digital to Analog Converter 500 at least partly driving an amplifier 510 as shown in FIGS. 7A to 7C. The first digital to analog converter may further drive a first filter 520, which in turn drives the amplifier. A second digital to analog converter 502-2 may drive the amplifier to control the gain of the amplifier. Note that even when the test signal is one million Hz, the computer 230 and/or the finite state machine 1000 may drive the first digital to analog converter at several times that frequency, say four times that frequency to create the test signal.

Figure 7D:
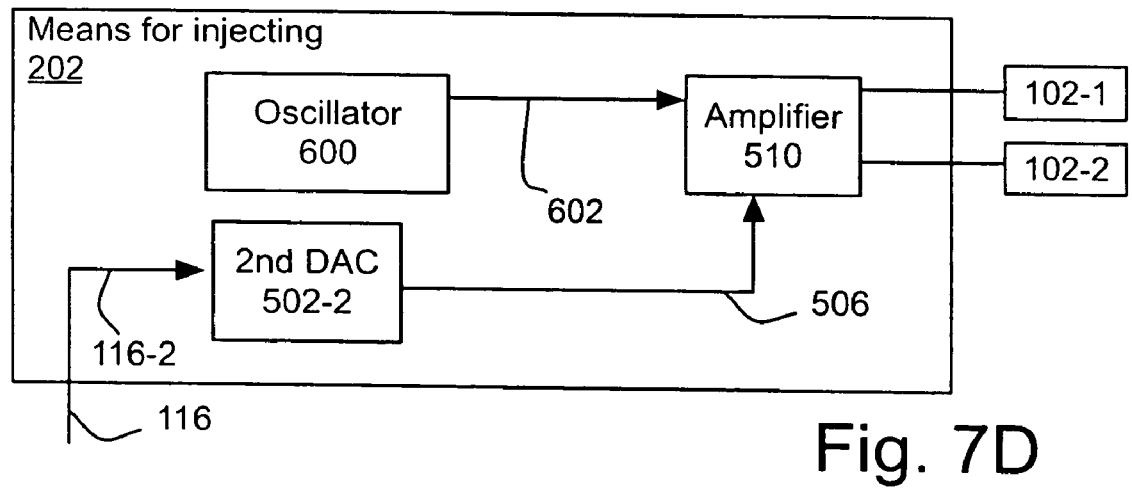
Figure 8A:
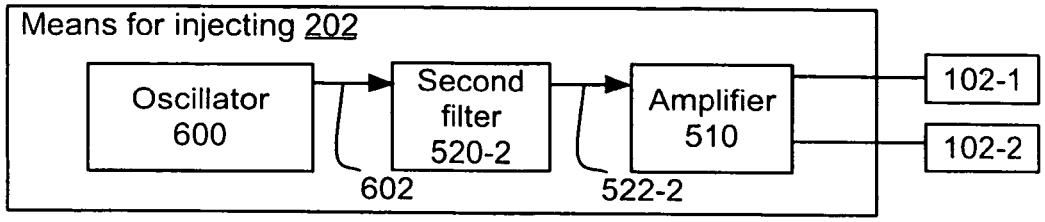
Figure 8B:
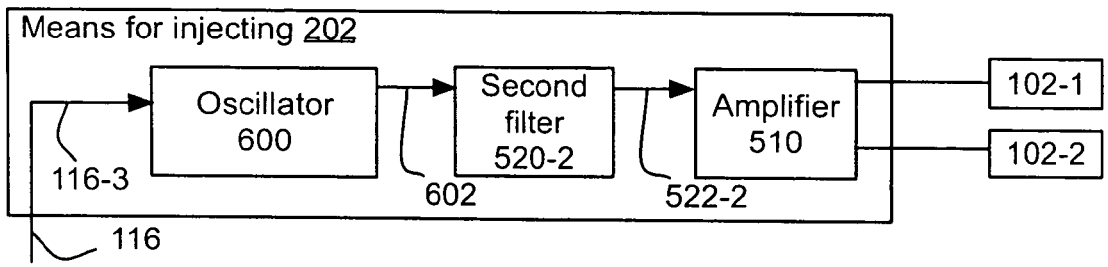
Figure 8C:
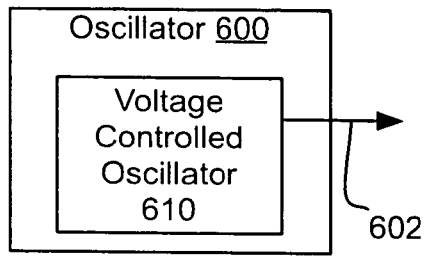
Figure 8D:
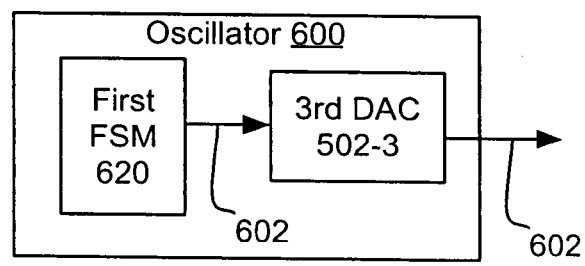
Figure 8E:
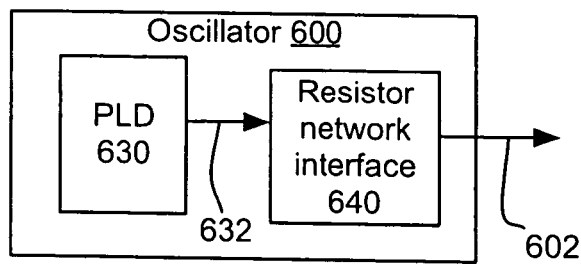

Alternatively, the means for injecting 202 may include an oscillator 600 at least partly driving the amplifier 510 as shown in FIGS. 7D to 8B. The oscillator may further drive a second filter 520-2, which in turn drives the amplifier. The oscillator may be directly controlled by the means for controlling 220 as shown in FIG. 8B. Alternatively, the oscillator may operate independently of the means for controlling, as shown in FIGS. 7D, 8A, and 8C to 8E. The oscillator may include a voltage controlled oscillator 610 as shown in FIG. 8C. Alternatively, the oscillator may include a first finite state machine 620 driving a third digital to analog converter 502-3, as shown in FIG. 8D. The oscillator may further include a programmable logic device 630 driving a resistor network interface 640 as shown in FIG. 8E. A second digital to analog converter 502-2 may drive the amplifier to control the gain of the amplifier, as shown in FIG. 7D.

The means for measuring 204 may include an analog to digital converter 560 creating a soil conductivity sample value 110 at least partly based upon the conductivity of the soil 10 between the first electrical coupling 102-1 and the second electrical coupling 102-2 as shown in FIGS. 9A to 9D. The analog to digital converter may be at least partly driven by a third filter 520-3, which is in turn fed by the first electrical coupling and the second electrical coupling. The third filter may further drive a detector 570, which at least partly drives the analog to digital converter.

The detector 570 may further drive an attenuator 580, which in turn drives the analog to digital converter 560. The detector may be a peak detector, alternatively, a root-mean-square detector, or another form of an integrator, possibly windowed.

Figure 9A:
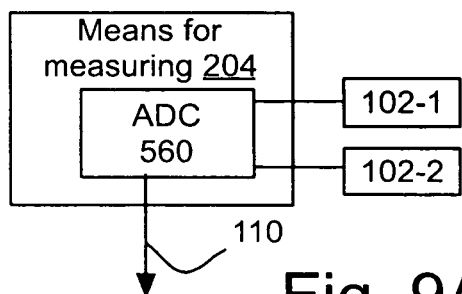
Figure 9B:
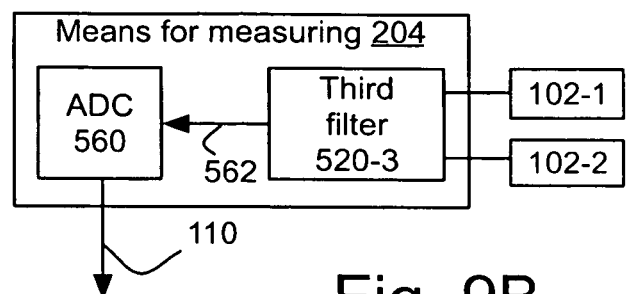
Figure 9C:
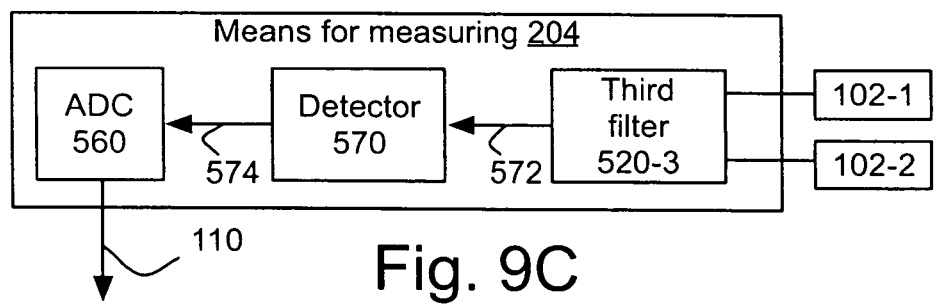
Figure 9D:
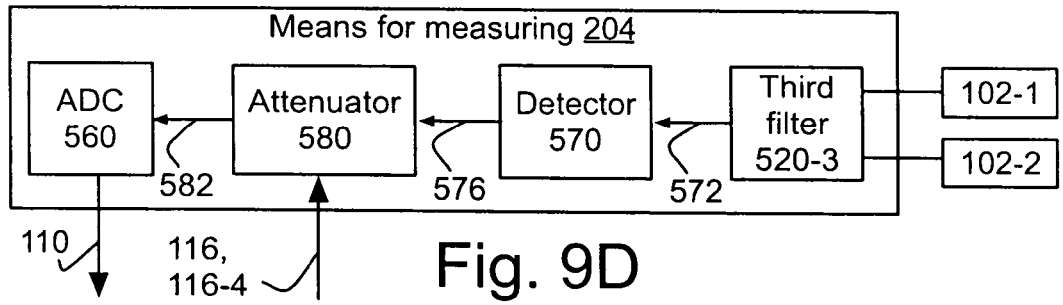
Figure 9E:
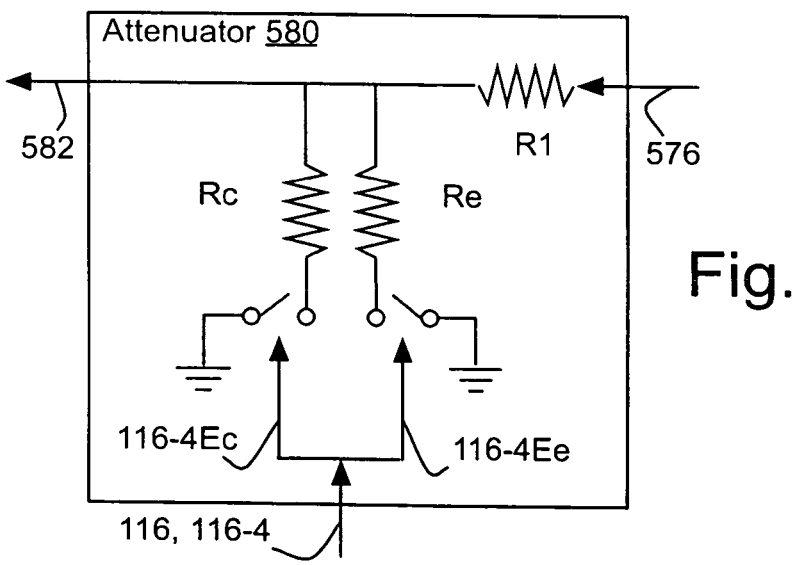

The attenuator 580 may include at least two attenuation settings as shown in FIG. 9E, which may further be controlled by a computer 230, a finite state machine 1000, and/or the means for controlling 220 the irrigation system 300, as shown in FIGS. 10A, 11A, 12A, and 14. The attenuator settings may act to scale the conductivity reading of the analog to digital converter 560, creating the soil conductivity sample value 110 as a scaling of the conductivity, which may then be used in the determination of the water absorption gradient 210.

The means for controlling 220 may include the water absorption gradient 210, which is used for control decisions about the irrigation system and as shown in FIGS. 3A, 10A, 12A, 13A, and 14. The water absorption gradient may be implemented using the present value 212 of the soil conductivity sample value 110 and the past value 216. Alternatively, the water absorption gradient may be implemented using the present value 212 and the difference between present and past value 214. Also, the water absorption gradient may be implemented using the soil conductivity scale ratio 218.

The means for controlling 220 may include the finite state machine 1000 and/or the computer 230 accessibly coupled 232 to a memory 234, and directed by a program system 1000 including program steps residing in the memory as shown in FIGS. 3A, 6A, 10A, and 14. In certain embodiments, the finite state machine and/or the computer may be considered separate from the means for determining 200 and the means for controlling 220, as shown in FIGS. 12A. The finite state machine and/or the program system may implement the method controlling the irrigation system 300.

When the apparatus 100 determines that the soil 10 is almost saturated in water, it preferably stores the present value 212 of the soil conductance into a non-volatile memory component to create a stored past value of the soil conductance. The stored value is later compared with a present conductance value at the start of the next watering cycle.

Preferably, the next watering cycle should only be initiated by the irrigation system 300 if the water in the soil 10 is sufficiently depleted. The next watering cycle is preferably activated, if the water absorption gradient 210 is below a second threshold 252. By way of example, the second threshold may be at least one half. Further, the second threshold may be at least five eighths.

As used herein, a computer includes at least one instruction processor and at least one data processor. Each of the data processors is directed by at least one of the instruction processors.

Some of the following figures show flowcharts of at least one method of the invention, possessing arrows with reference numbers. These arrows will signify of flow of control and sometimes data supporting implementations including
- at least one program operation or program thread executing upon a computer,
- at least one inferential link in an inferential engine,
- at least one state transitions in a finite state machine, and/or
- at least one dominant learned response within a neural network.

The operation of starting a flowchart is designated by an oval with the text "Start" in it, and refers to at least one of the following.
- Entering a subroutine in a macro instruction sequence in a computer.
- Entering into a deeper node of an inferential graph.
- Directing a state transition in a finite state machine, possibly while pushing a return state.
- And triggering a list of neurons in a neural network.

The operation of termination in a flowchart is designated by an oval with the text "Exit" in it, and refers to the completion of those operations, which may result in at least one of the following.
- return from a subroutine return,
- traversal of a higher node in an inferential graph,
- popping of a previously stored state in a finite state machine, and/or
- return to dormancy of the firing neurons of the neural network.

The method of controlling the irrigation system 300 is shown from two separate perspectives that of a program system 1000 directing the computer 230 and as the finite state machine 1000. FIG. 10B shows the overall watering cycle, which may be asserted in the finite state machine by the W signal as shown in FIG. 12B, or asserted in the computer by a power on reset and/or an interrupt. A similar process involving polling the means for determining may be implemented as well. For the sake of simplicity of discussion, we will assume that one of these mechanisms causes the starting of the flowchart.

Operation 1200 determines whether the timer 700 is activated? If yes, activities proceed to operation 1210, otherwise, to operation 1250.

Operation 1210 determines if the water absorption gradient 210 is below the second threshold 252? If yes, activities proceed to operation 1220, otherwise to operation 1250.

Operation 1220 starts the watering process, preferably turning on the electric valve 304.

Operation 1230 tests if the water absorption gradient 210 is below the first threshold 250? Preferably, the water absorption gradient is determined before testing. Preferably, this includes creating and/or receiving at least a present value 212 from the means for determining 200 the water absorption gradient. Note that in certain preferred embodiments, the difference between present and past value 214, and/or the soil conductivity scale ratio 218 may also be created by the means for determining. If yes, then activities proceed to operation 1240, otherwise, to operation 1260.

Operation 1240 stops the watering process, preferably turning off the electric valve.

Operation 1250 waits for the timer to be activated. Once activated, activities proceed to operation 1200.

Operation 1260 stores the present value as the past value.

Figure 3A:
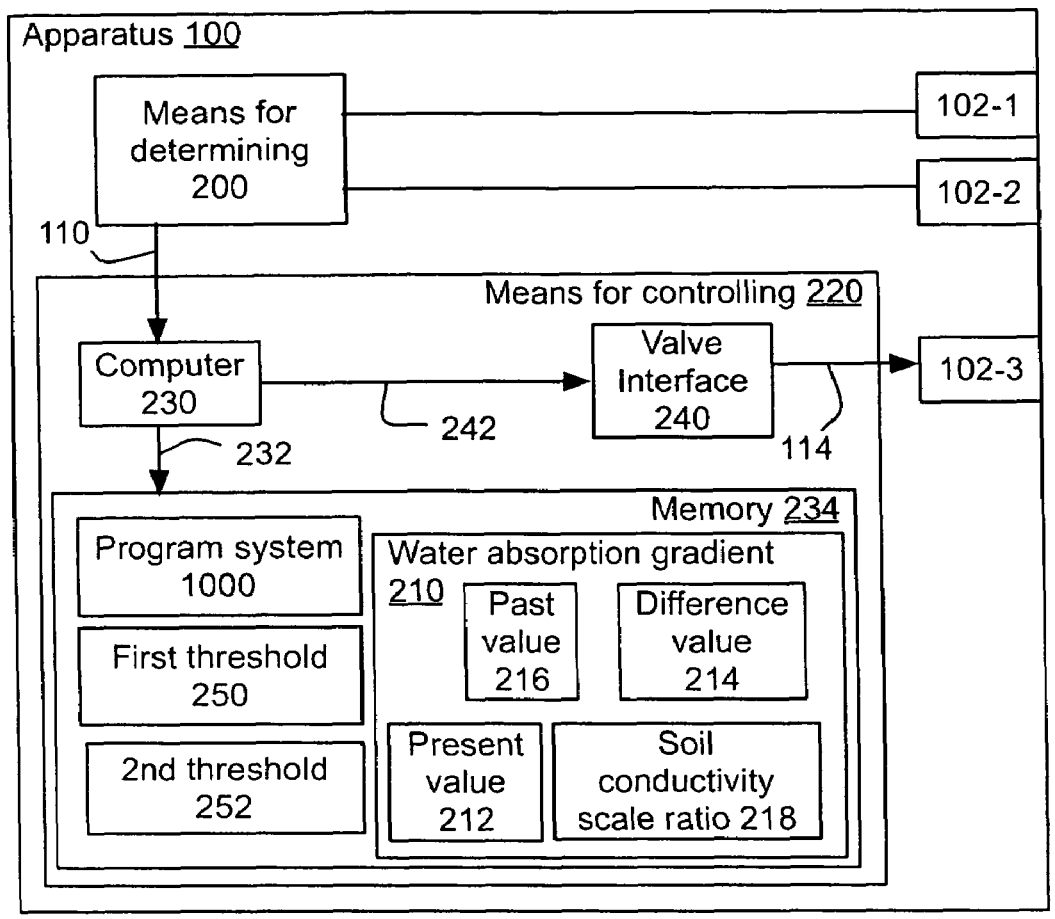
FIGS. 3A and 6A show example implementations of the apparatus of FIG. 1A.
Figure 3B:
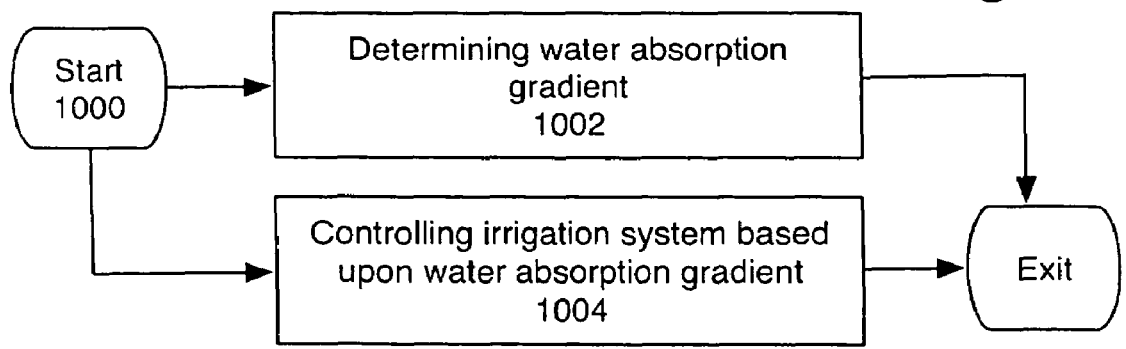
FIGS. 3B to 5D show some details of the method of operation as implemented by the program system of FIGS. 3A and 6A.

Seen from another perspective the method controlling the irrigation system 300 may be seen as the program system 1000 directing the computer 230 and/or the finite state machine 1000, is shown in FIG. 3B. Note that these operations and those of the following flowcharts may be used in either an implementation based upon a computer directed by its program system and/or a finite state machine.

Operation 1002 supports determining the water absorption gradient 210.

And operation 1004 supports controlling the irrigation system based upon the water absorption gradient.

Figure 3C:
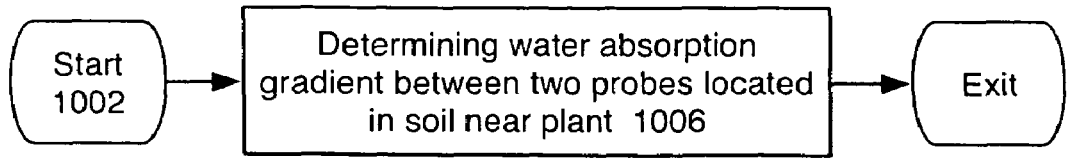

FIG. 3C shows a detail of determining the water absorption gradient 210 supported by operation 1002 of FIG. 3B. Operation 1006 supports determining the water absorption gradient between the first probe 106-1 and the second probe 106-2 located in the soil 10 near at least one plant 120.

Figure 4A:
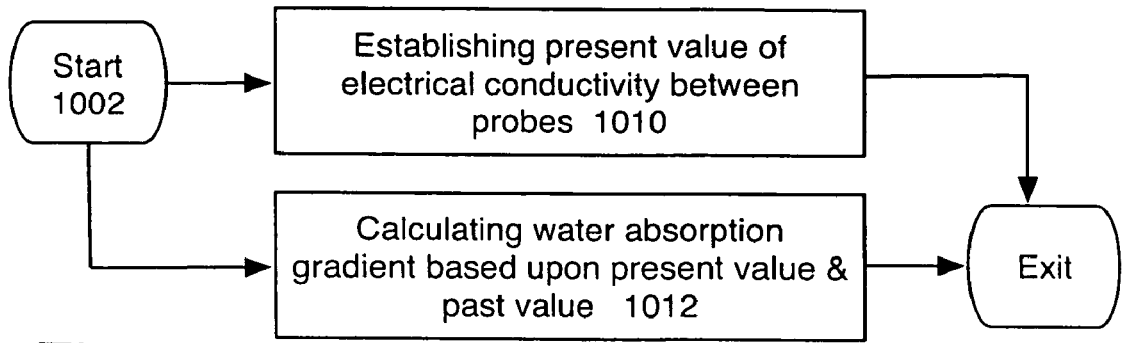

FIG. 4A shows a further detail of determining the water absorption gradient 210 supported by operation 1002 of FIG. 3B.

Operation 1010 supports establishing the present value 212 of the electrical conductance between the first probe 106-1 and the second probe 106-2.

And operation 1012 supports calculating the water absorption gradient based upon the present value and the past value 216.

Figure 4B:
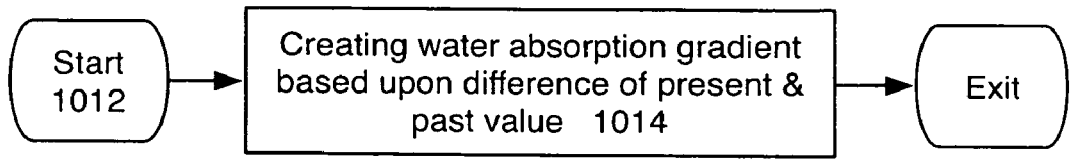

FIG. 4B shows a further detail of calculating the water absorption gradient 210 supported by operation 1012 of FIG. 4A. Operation 1014 supports creating the water absorption gradient based upon the difference between present and past value 214.

Figure 4C:
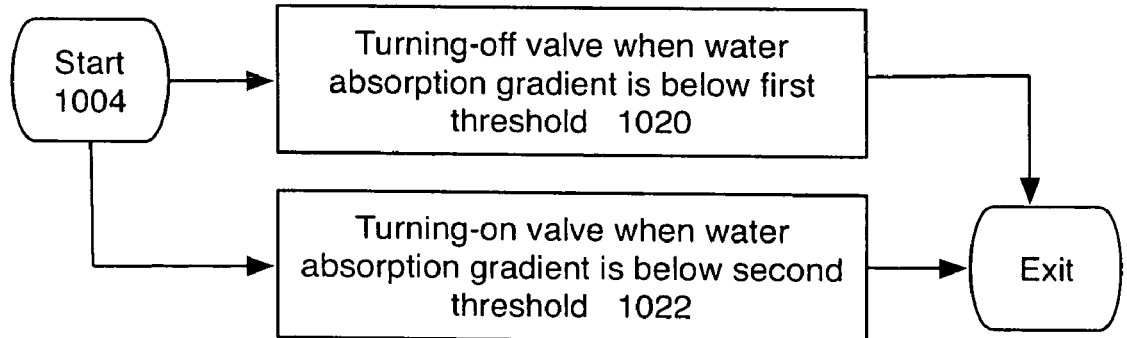

FIG. 4C shows a further detail of controlling the irrigation system 300 supported by operation 1004 of FIG. 3B.

Operation 1020 supports turning-off the electric valve 304 when the water absorption gradient 210 is below the first threshold 250. Note that the discussion of this operation is similarly applicable to the embodiments based upon operations 1210 and 1220 in FIG. 10B.

And operation 1022 supports turning-on the electric valve 304 when the water absorption gradient 210 is below the second threshold 252. Note that the discussion of this operation is similarly applicable to the embodiments based upon operations 1230 and 1240 of FIG. 10B.

Figure 4D:
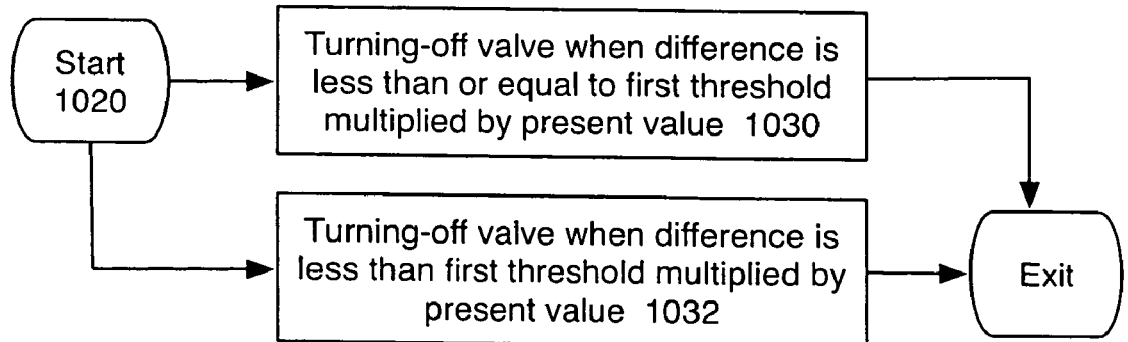

FIG. 4D shows a further detail of turning-off the electric valve 304 supported by operation 1020 of FIG. 4C, including one of the following.

Operation 1030 supports turning-off the electric valve when the difference between present and past value 214 is less than or equal to the first threshold 250 multiplied by the present value 212.

And operation 1032 supports turning-off the electric valve when the difference between present and past value is less than the first threshold multiplied by the present value.

Figure 5A:
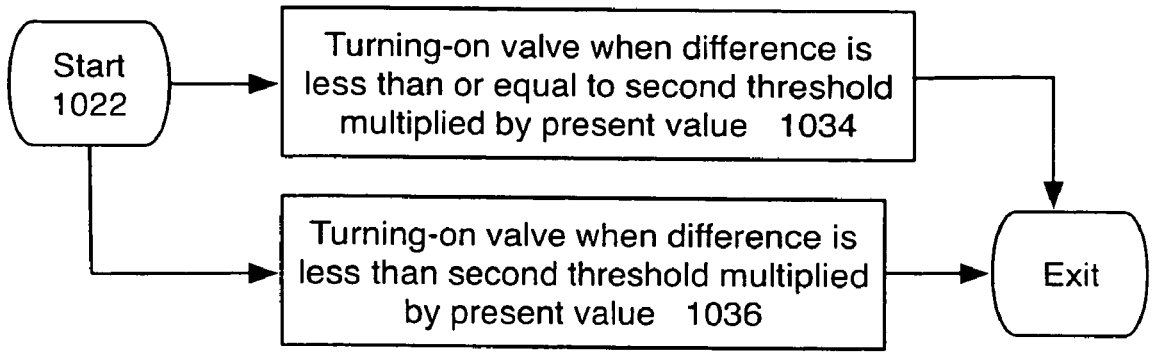

FIG. 5A shows a further detail of turning-on the electric valve 304 supported by operation 1022 of FIG. 4C.

Operation 1040 supports turning-on the electric valve when the difference between present and past value 214 is less than or equal to the second threshold 252 multiplied by the present value 212.

And operation 1042 supports turning-on the electric valve when the difference between present and past value is less than the second threshold multiplied by the present value.

Figure 5B:
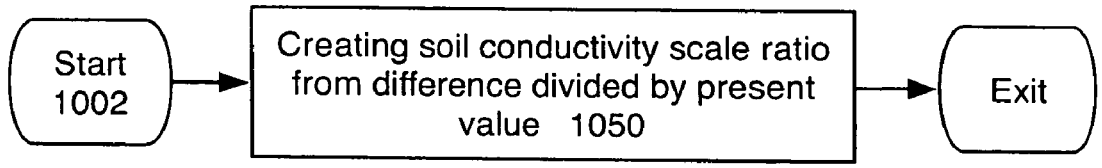

FIG. 5B shows a further detail of determining the water absorption gradient 210 supported by operation 1002 of FIG. 3B. Operation 1050 supports creating the soil conductivity scale ratio 218 from difference between present and past value 214 divided by the present value 212.

Figure 5C:
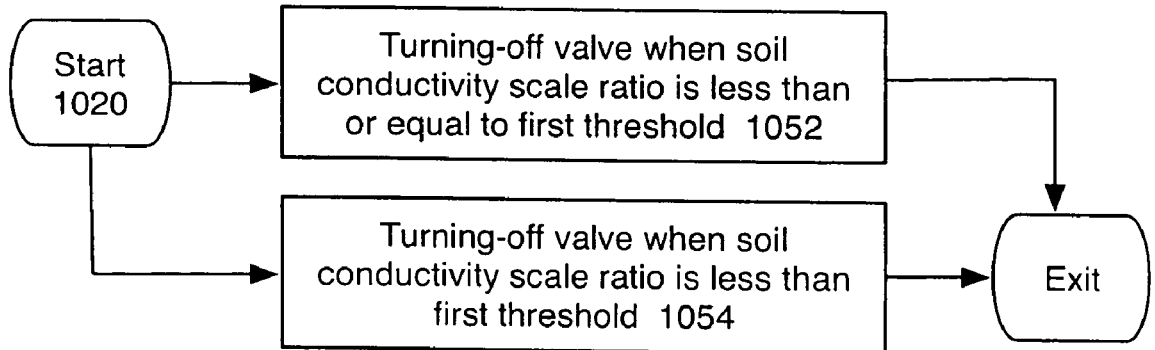

FIG. 5C shows a further detail of turning-off the electric valve 304 supported by operation 1020 of FIG. 4C, including one of the following.

Operation 1052 supports turning-off the electric valve when the soil conductivity scale ratio 218 is less than or equal to the first threshold 250.

And operation 1054 supports turning-off the electric valve when the soil conductivity scale ratio is less than the first threshold.

Figure 5D:
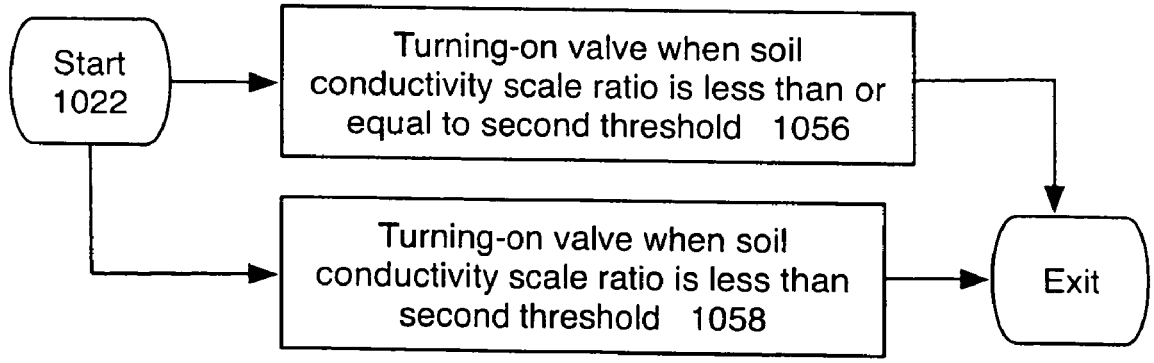

FIG. 5D shows a further detail of turning-on the electric valve 304 supported by operation 1022 of FIG. 4C.

Operation 1056 supports turning-on the electric valve when the soil conductivity scale ratio 218 is less than or equal to the second threshold 252.

And operation 1058 supports turning-on the electric valve when the soil conductivity scale ratio is less than the second threshold.

The memory 234 may include the water absorption gradient 210. The memory may include a non-volatile memory component. The program steps of the program system 1000 reside in the non-volatile memory component. At least the past value 216 may reside in the non-volatile memory component at least part of the time.

Figure 13A:
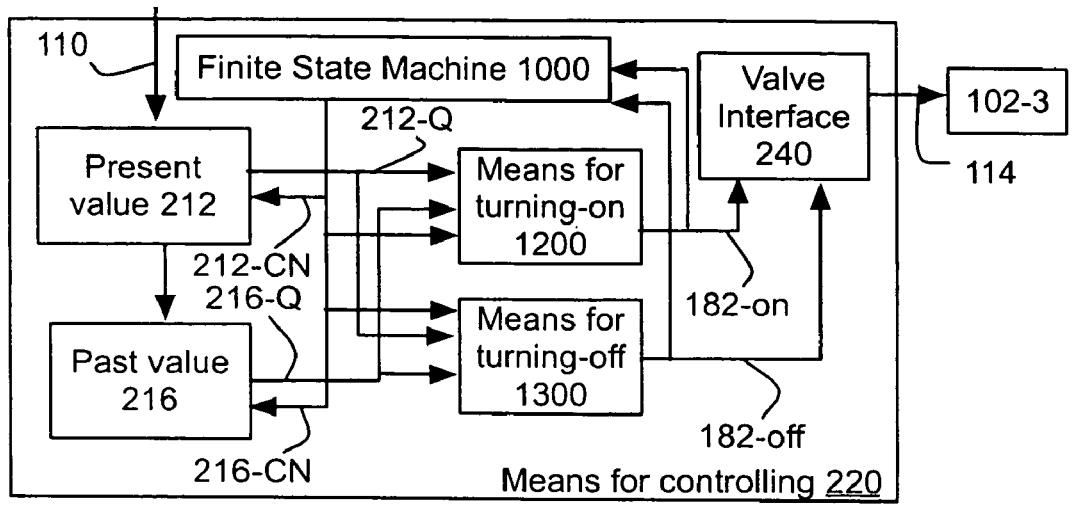
Figure 13B:
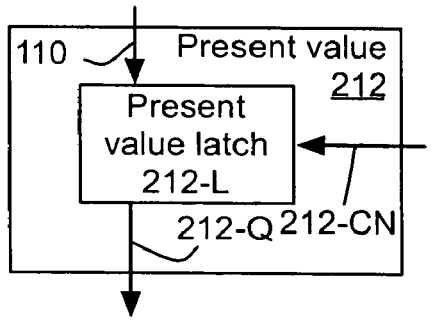
Figure 13C:
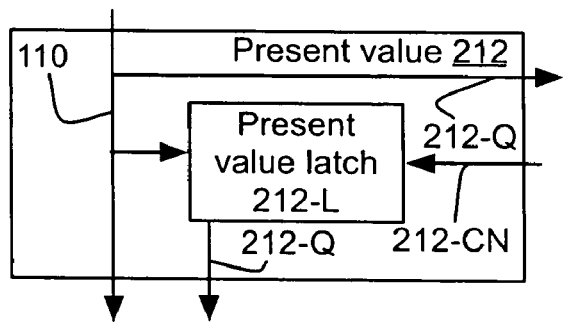
Figure 13D:
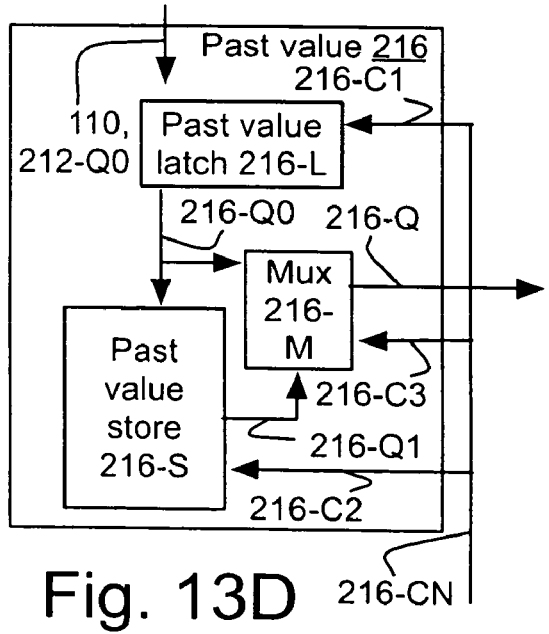
Figure 13E:
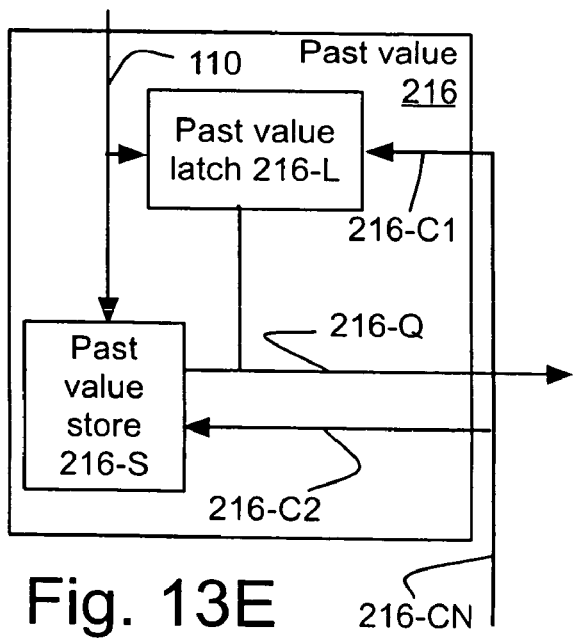

Alternatively, the water absorption gradient 210 may include a non-volatile memory component, referred to herein as the past value store 216-S, which may be used at least some of the time to retain the past value 216, as shown in FIGS. 13D and 13E.

Figure 11C:
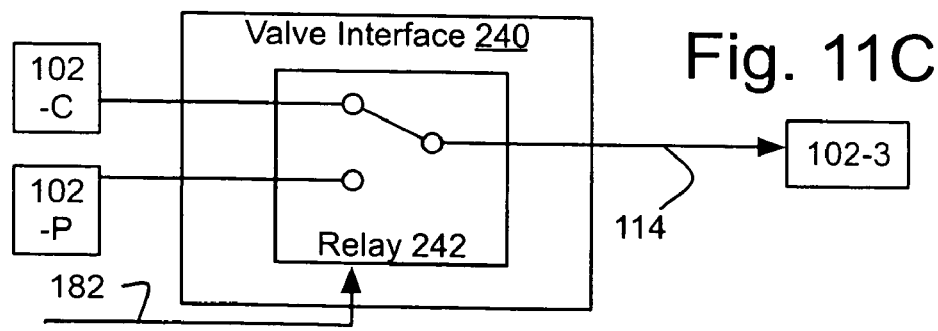
FIG. 11C shows an example of the details of the electric valve interface of the previous Figures.

The means for controlling 220 the irrigation system 300 may include a valve interface 240 receiving an valve interface control 182 to drive the control electrical coupling to the electric valve 304 included in the irrigation system as shown in FIGS. 1A, 2C, 3A, and 10A. The valve interface may further receive a common power coupling 102-C and/or a specific power coupling 102-P, as shown in FIGS. 11A and 11C. The valve interface may include a relay controlled by the valve interface control, which may preferably switch between the common power coupling and the specific power coupling in driving the control electrical coupling.

The invention also includes turning-off the electric valve 304 if no water absorption change is determined, which occurs when the soil 10 is saturated after a rain or because of a broken sprinkler head.

Figure 15A:
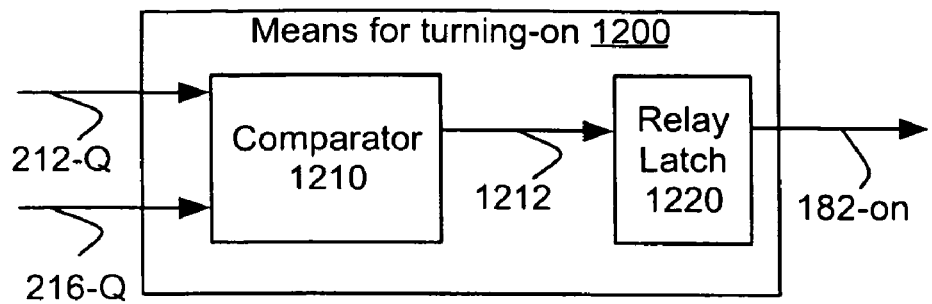
FIGS. 15A to 15C show some details of the means for controlling of the previous Figures.

The means for controlling 220 may further include the means for turning-on 1200 the irrigation system 300 and/or the means for turning-off 1300 the irrigation system as shown in FIGS. 12B, 13A, and 14. The means for turning-on may provide a valve interface on-control 182-on to the valve interface 240. The means for turning-on may include a first relay latch 1220 providing the valve interface on-control as shown in FIG. 15A. The past value state 216-Q and the present value state 212-Q may be provided to a first comparator 1210, which generates a first comparator result 1212 provided to the first relay latch 1220. Alternatively, the present value 212 may be provided instead of the present value state. The first comparator result may indicate an arithmetic comparison of the present value and the past value state, or the logical negation of the arithmetic comparison. The first comparator result could indicate that the present value is greater than the past value state, that the present value is greater than or equal to the past value state, or that the present value is less than the past value state.

Figure 15B:
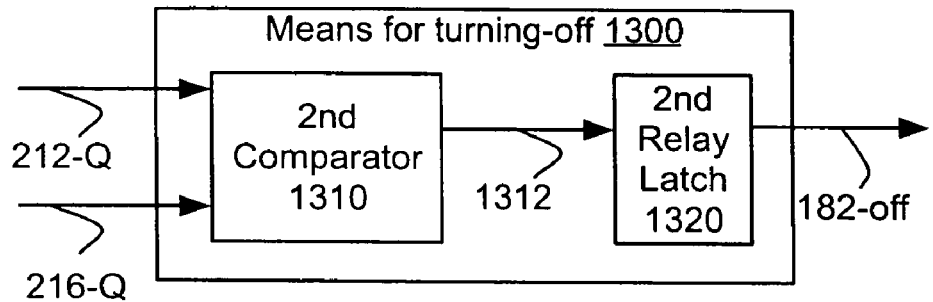
Figure 15C:
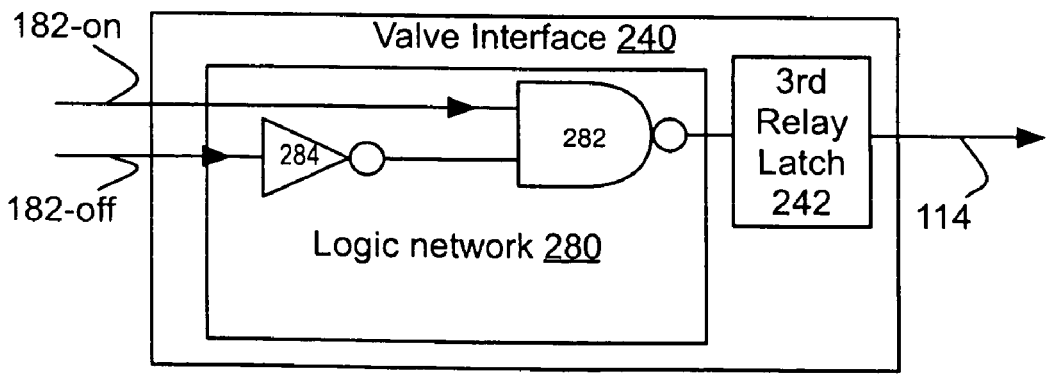

Similarly, the means for turning-off 1300 may provide a valve interface off-control 182-off to the valve interface 240. The means for turning-off may include a second relay latch 1320 providing the valve interface off-control as shown in FIG. 15B. The past value state 216-Q and the present value state 212-Q may be provided to a second comparator 1310, which generates a second comparator result 1312 provided to the second relay latch. Alternatively, the present value 212 may be provided instead of the present value state. The second comparator result could indicate an arithmetic comparison of the present value and the past value state, or the logical negation of the arithmetic comparison. The second comparator result could indicate that the present value is greater than the past value state, that the present value is greater than or equal to the past value state, or that the present value is less than the past value state.

The valve interface 240 may include a third relay latch 242 providing the irrigation control signal 114. The valve interface may further receive the valve interface off-control 182-off and/or the valve interface on-control 182-on. The valve interface may further include a logic network 280 receiving the valve interface off-control and the valve interface on-control to create an irrigation control direction 248 presented to the third relay latch 242.

As used herein, any of the latches may support synchronous and/or asynchronous operation, including but not limited to, Reset Set (RS) flop-flops, D flip-flops, and master-slave (JK) flip-flops, for example.

The apparatus 100 may include more than one specific power coupling 102-P, and drive more than one electric valve 304. The apparatus may be included in the timer 700. The timer may include more than one instance of the apparatus.

Figure 16A:
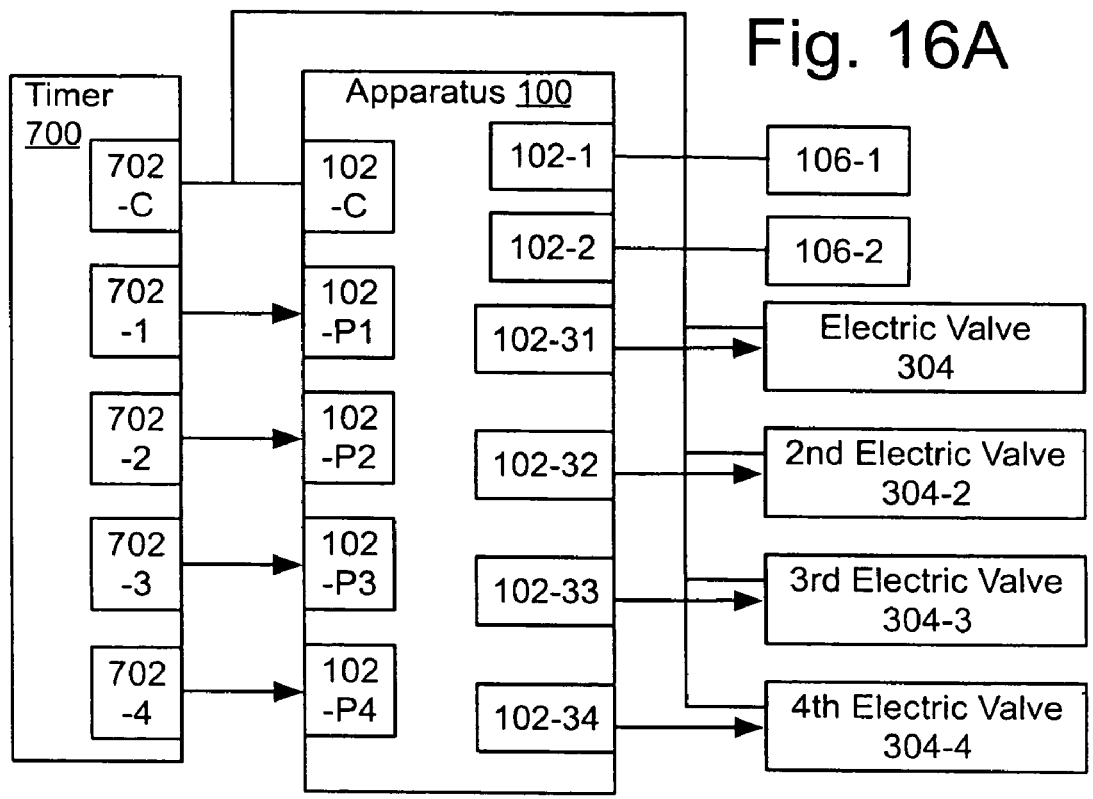
FIGS. 16A and 16B show embodiments of the apparatus for controlling more than one electric valve.
Figure 16B:
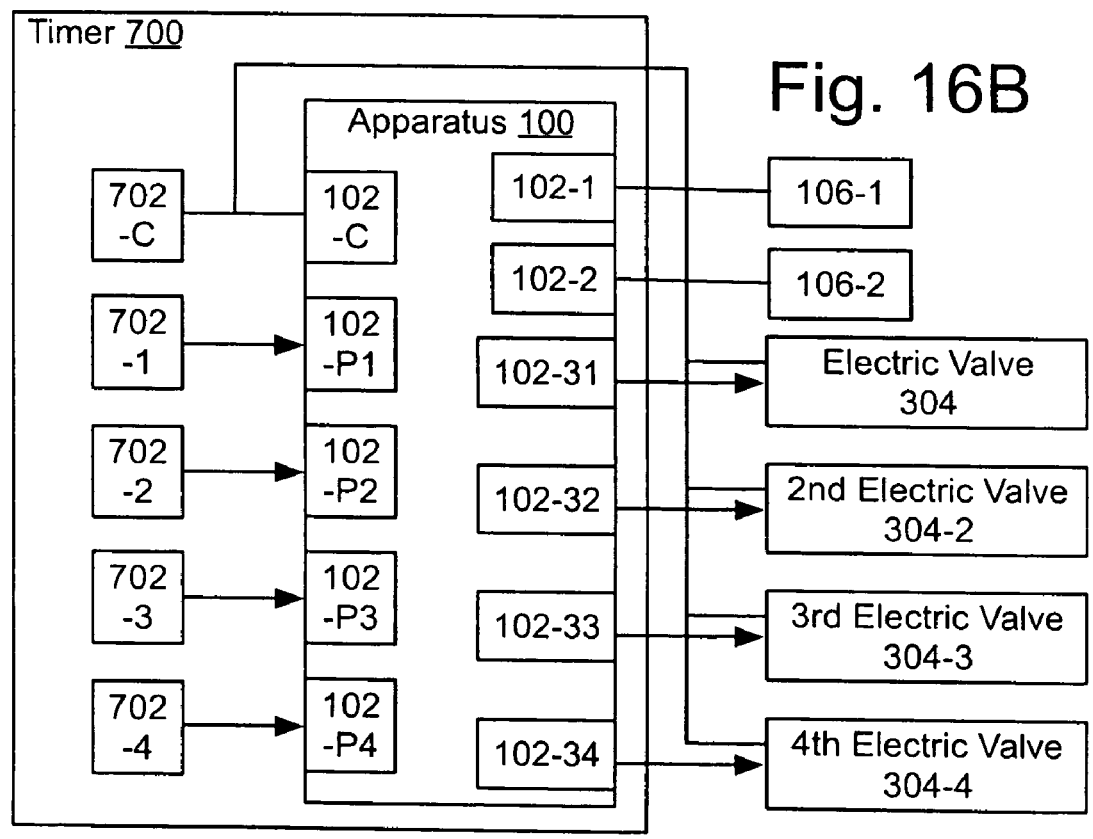

FIGS. 16A and 16B show the apparatus including a first specific power coupling 102-P1, a second specific power coupling 102-P2, a third specific power coupling 102-P3, and a fourth specific power coupling 102-P4, similar to the one specific power coupling 102-P of the previous Figures.

These Figures also show the apparatus including a first control electrical coupling 102-31, a second control electrical coupling 102-32, a third control electrical coupling 102-33, and a fourth control electrical coupling 102-34, similar to the control electrical coupling 102-3 of the previous Figures.

The operation of the apparatus may proceed independently for each of the specific power couplings. By way of example, the first specific power coupling may trigger on Mondays, whereas the second specific power coupling may trigger on Tuesday, and so on.

Figure 17:
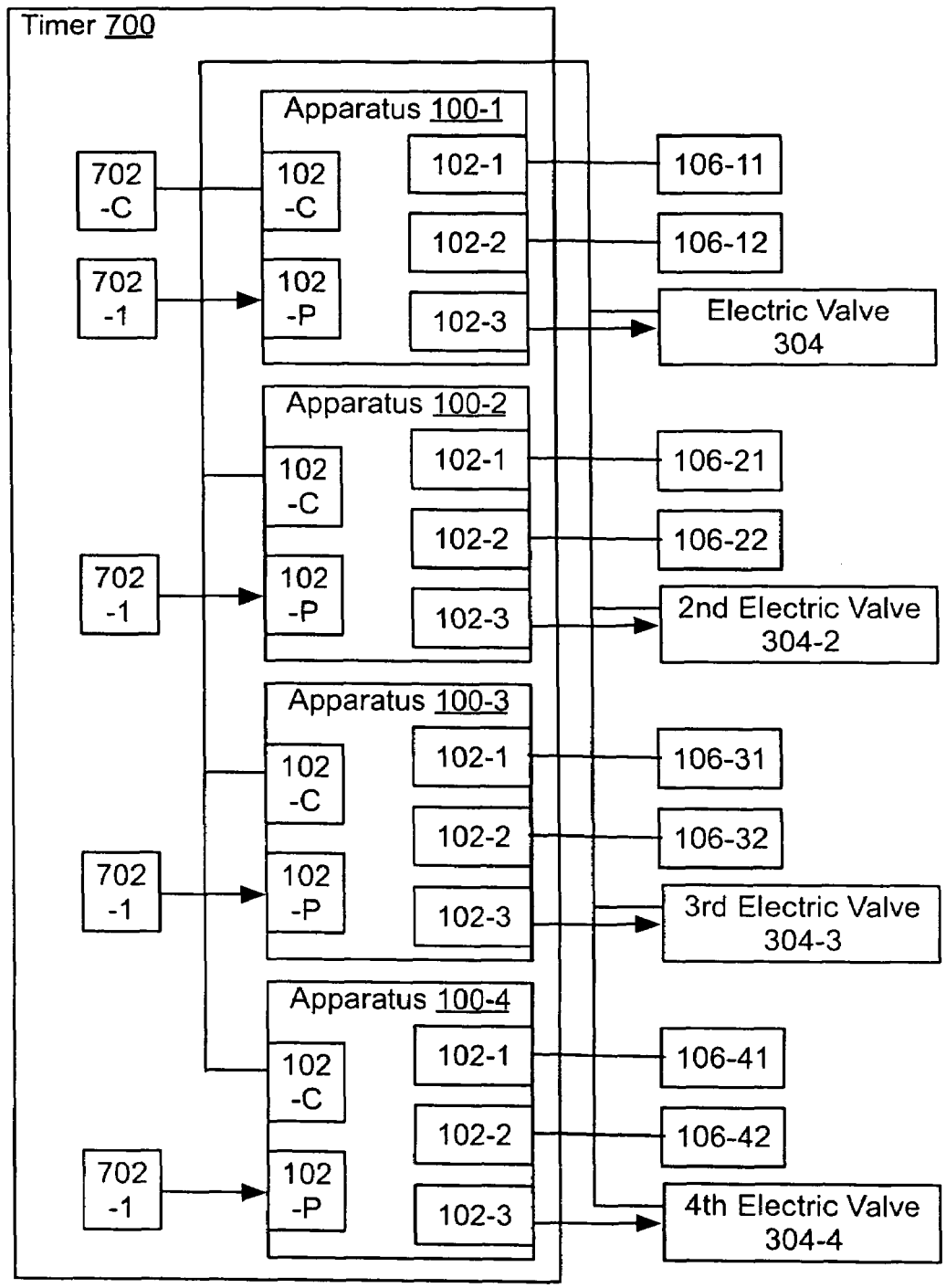
FIG. 17 shows an irrigation system timer including multiple instance of the apparatus for independent control of multiple electric valves.

The apparatus 100 is included in the timer in FIG. 16B and FIG. 17 shows multiple instances of the apparatus included in it.

The timer of FIG. 17 includes a first apparatus instance 100-1, a second apparatus instance 100-2, a third apparatus instance 100-3, and a fourth apparatus instance 100-4.

In certain embodiments, as shown in FIGS. 16A and 16B, the first probe 106-1 and the second probe 106-2 may be preferably shared for each of the watering cycles. This may be advantageous if there is a low spot which all the sprinklers feed.

In certain other embodiments, as shown in FIG. 17, each of the apparatus instances are electrically coupled to a separate pair of probes.

For the first apparatus instance 100-1, the first electrical coupling 102-1 is connected to the first-first probe 106-11, and the second electrical coupling 102-2 is connected to the first-second probe 106-12.

For the second apparatus instance 100-2, the first electrical coupling 102-1 is connected to the second-first probe 106-21, and the second electrical coupling 102-2 is connected to the second-second probe 106-22.

For the third apparatus instance 100-3, the first electrical coupling 102-1 is connected to the third-first probe 106-31, and the second electrical coupling 102-2 is connected to the third-second probe 106-32.

For the fourth apparatus instance 100-4, the first electrical coupling 102-1 is connected to the fourth-first probe 106-41, and the second electrical coupling 102-2 is connected to the fourth-second probe 106-42.

The preceding embodiments provide examples of the invention and are not meant to constrain the scope of the following claims.

What is claimed is:

1. A method, comprising the step of:
   operating an irrigation system delivering water to at least one plant, comprising the steps of:
   determining a water absorption gradient based upon the difference of a present value and a past value, with both said present value and said past value as measured functions of soil conductance between at least two probes each separately located in soil near said plant; and
   controlling said irrigation system based upon said water absorption gradients, further comprising of the step:
   controlling at least one electric valve directing said water to said at least one plant based upon said water absorption gradient, further comprising one of the steps:
   turning-off said electric valve when said difference is less than or equal to said first threshold multiplied by said present value; and
   turning-off said electric valve when said difference is less than said first threshold multiplied by said present value.

2. The method of claim 1, where said plant includes at least one of a grass, a clover, an alfalfa, and a ground cover.

3. The method of claim 1, wherein the step determining said water absorption gradient, comprises the steps:
   determining said water absorption gradient between two of said probes located in said soil near said plant.

4. The method of claim 1, wherein the step determining said water absorption gradient, comprises the steps:
   establishing a present value of the electrical conductivity between said probes; and
   calculating said water absorption gradient based upon said present value and said past value.

5. The method of claim 4, wherein the step determining said water absorption gradient further comprises the step:
   setting a state in at least one member of a state group of said past value to said present value, wherein said state group consists of the members of a memory, a store and a latch.

6. The method of claim 5 wherein the step setting said past value, comprises the step: writing said present value to a non-volatile memory to create a stored value of said past value.

7. The method of claim 6, wherein the step creating said conductivity difference, comprises the step: reading said stored value from said non-volatile memory to retrieve said past value.

8. The method of claim 1, wherein the step controlling said electric valve, further comprises the step:
   turning-on said electric valve when said water absorption gradient is below a second threshold.

9. The method of claim 8, wherein the step determining said water absorption gradient further comprises the step:
   creating a soil conductivity scale ratio from said difference divided by said present value; and
   wherein the step turning-off said electric valve, further comprises one of the steps:
   turning-off said electric valve when said soil conductivity scale ratio is less than or equal to said first threshold; and
   turning-off said electric valve when said soil conductivity scale ratio is less than said first threshold.

10. The method of claim 8, wherein the step turning-on said electric valve, further comprises one of the steps:
    turning-on said electric valve when said difference is less than or equal to said negative of said second threshold multiplied by said present value; and
    turning-on said electric valve when said difference is less than said negative of said second threshold multiplied by said present value.

11. The method of claim 8, further comprising the step: creating a soil conductivity scale ratio as said difference divided by said present value; and
    wherein the step turning-on said electric valve, further comprises one of the steps:
    turning-on said electric valve when said soil conductivity scale ratio is less than or equal to said negative of said second threshold; and
    turning-on said electric valve when said soil conductivity scale ratio is less than said negative of said second threshold.

12. A method, comprising the step of:
    operating an irrigation system delivering water to at least one plant, comprising the steps of:
    determining a water absorption gradient based upon the difference of a present value and a past value, with both said present value and said past value as measured functions of soil conductance between at least two probes each separately located in soil near said plant, further comprises the step:
    creating a soil conductivity scale ratio from said difference divided by said present value; and
    controlling said irrigation system based upon said water absorption gradient, further comprising the step:
    controlling at least one electric valve directing said water to said at least one plant based upon said water absorption gradient, further comprising one of the steps:
    turning-off said electric valve when said soil conductivity scale ratio is less than or equal to said first threshold; and
    turning-off said electric valve when said soil conductivity scale ratio is less than said first threshold.

13. The method of claim 12, where said plant includes at least one of a grass, a clover, an alfalfa, and a ground cover.

14. The method of claim 12, wherein the step determining said water absorption gradient, comprises the steps:
    determining said water absorption gradient between two of said probes located in said soil near said plant.

15. The method of claim 12, wherein the step determining said water absorption gradient, comprises the steps:
establishing a present value of the electrical conductivity between said probes; and
calculating said water absorption gradient based upon said present value and said past value.

16. The method of claim 15, wherein the step determining said water absorption gradient further comprises the step:
setting a state in at least one member of a state group of said past value to said present value, wherein said state group consists of the members of a memory, a store and a latch.

17. The method of claim 16, wherein the step setting said past value, comprises the step: writing said present value to a non-volatile memory to create a stored value of said past value.

18. The method of claim 17, wherein the step creating said conductivity difference, comprises the step: reading said stored value from said non-volatile memory to retrieve said past value.

19. The method of claim 12, wherein the step controlling said electric valve, further comprises the step:
turning-on said electric valve when said water absorption gradient is below a second threshold.

20. The method of claim 19, wherein the step turning-on said electric valve, further comprises one of the steps:
turning-on said electric valve when said difference is less than or equal to said negative of said second threshold multiplied by said present value; and
turning-on said electric valve when said difference is less than said negative of said second threshold multiplied by said present value.

21. The method of claim 19, wherein the step turning-on said electric valve, further comprises one of the steps:
turning-on said electric valve when said soil conductivity scale ratio is less than or equal to said negative of said second threshold; and
turning-on said electric valve when said soil conductivity scale ratio is less than said negative of said second threshold.

22. A method, comprising the step of:
operating an irrigation system delivering water to at least one plant, comprising the steps of:
determining a water absorption gradient based upon a present value and a past value, with both said present value and said past value as measured functions of soil conductance between at least two probes each separately located in soil near said plant; and
controlling said irrigation system based upon said water absorption gradient, comprising the step:
controlling at least one electric valve directing said water to said at least one plant based upon said water absorption gradient, comprising one of the steps:
turning-on said electric valve when said difference is less than or equal to said negative of said second threshold multiplied by said present value; and
turning-on said electric valve when said difference is less than said negative of said second threshold multiplied by said present value.

23. The method of claim 22, where said plant includes at least one of a grass, a clover, an alfalfa, and a ground cover.

24. The method of claim 22, wherein the step determining said water absorption gradient, comprises the steps:
determining said water absorption gradient between two of said probes located in said soil near said plant.

25. The method of claim 22, wherein the step determining said water absorption gradient, comprises the steps:
establishing a present value of the electrical conductivity between said probes; and
calculating said water absorption gradient based upon said present value and said past value.

26. The method of claim 25, wherein the step determining said water absorption gradient further comprises the step:
setting a state in at least one member of a state group of said past value to said present value, wherein said state group consists of the members of a memory, a store and a latch.

27. The method of claim 26, wherein the step setting said past value, comprises the step: writing said present value to a non-volatile memory to create a stored value of said past value.

28. The method of claim 27, wherein the step creating said conductivity difference, comprises the step: reading said stored value from said non-volatile memory to retrieve said past value.

29. The method of claim 22, wherein the step controlling said electric valve, further comprises the step:
turning-on said electric valve when said water absorption gradient is below a second threshold.

30. The method of claim 29, further comprising the step: creating a soil conductivity scale ratio as said difference divided by said present value; and
wherein the step turning-on said electric valve, further comprises one of the steps:
turning-on said electric valve when said soil conductivity scale ratio is less than or equal to said negative of said second threshold; and
turning-on said electric valve when said soil conductivity scale ratio is less than said negative of said second threshold.

31. A method, comprising the step of:
operating an irrigation system delivering water to at least one plant, comprising the steps of:
determining a water absorption gradient based upon a difference of a present value and a past value, with both said present value and said past value as measured functions of soil conductance between at least two probes each separately located in soil near said plant;
creating a soil conductivity scale ratio as said difference divided by said present value; and
controlling said irrigation system based upon said water absorption gradient, further comprising the step:
controlling at least one electric valve directing said water to said at least one plant based upon said water absorption gradient, comprising one of the steps:
turning-on said electric valve when said soil conductivity scale ratio is less than or equal to said negative of said second threshold; and
turning-on said electric valve when said soil conductivity scale ratio is less than said negative of said second threshold.

32. The method of claim 31, where said plant includes at least one of a grass, a clover, an alfalfa, and a ground cover.

33. The method of claim 31, wherein the step determining said water absorption gradient, comprises the steps:
determining said water absorption gradient between two of said probes located in said soil near said plant.

34. The method of claim 31, wherein the step determining said water absorption gradient, comprises the steps:
establishing a present value of the electrical conductivity between said probes; and
calculating said water absorption gradient based upon said present value and said past value.

35. The method of claim 34, wherein the step determining said water absorption gradient further comprises the step:

setting a state in at least one member of a state group of said past value to said present value, wherein said state group consists of the members of a memory, a store and a latch.

36. The method of claim 35, wherein the step setting said past value, comprises the step: writing said present value to a non-volatile memory to create a stored value of said past value.

37. The method of claim 36, wherein the step creating said conductivity difference, comprises the step: reading said stored value from said non-volatile memory to retrieve said past value.

* * * * *